United States Patent [19]

Motoyama

[11] Patent Number: 5,448,691
[45] Date of Patent: Sep. 5, 1995

[54] METHOD AND APPARATUS FOR PROCESSING PAGE SELECTION IN A DOCUMENT PROCESSING LANGUAGE

[75] Inventor: Tetsuro Motoyama, San Jose, Calif.

[73] Assignees: Ricoh Company, Ltd., Tokyo, Japan; Ricoh Corporation, San Jose, Calif.

[21] Appl. No.: 158,674

[22] Filed: Nov. 29, 1993

Related U.S. Application Data

[63] Continuation-in-part of Ser. No. 87,571, Jul. 2, 1993, which is a continuation-in-part of Ser. No. 931,808, Aug. 11, 1992, Pat. No. 5,416,896, which is a continuation-in-part of Ser. No. 876,601, Apr. 30, 1992, Pat. No. 5,319,748, and a continuation-in-part of Ser. No. 876,251, Apr. 30, 1992, Pat. No. 5,325,484.

[51] Int. Cl.$^6$ ............................................. G06F 7/10
[52] U.S. Cl. ................................................... 395/145
[58] Field of Search ................. 395/144, 145, 147; 364/419.07, 419.1, 419.17, 419.19

[56] References Cited

U.S. PATENT DOCUMENTS

| | | | |
|---|---|---|---|
| 4,768,144 | 8/1988 | Winter et al. | 395/600 |
| 4,949,287 | 8/1990 | Yamaguchi et al. | 395/147 |
| 4,996,665 | 2/1991 | Nomura | 395/600 |
| 5,079,700 | 1/1992 | Kozol et al. | 364/419.17 |
| 5,113,341 | 5/1992 | Kozol et al. | 364/419.1 |
| 5,130,924 | 7/1992 | Barker et al. | 364/419.1 |
| 5,140,676 | 8/1992 | Langelaan | 395/145 |
| 5,181,162 | 1/1993 | Smith et al. | 364/419.19 |
| 5,253,337 | 10/1993 | Hirose | 395/161 |
| 5,263,133 | 11/1993 | Hyakutake et al. | 395/147 |
| 5,265,244 | 11/1993 | Ghosh et al. | 395/600 |
| 5,295,261 | 3/1994 | Simonetti | 364/419.19 X |
| 5,301,319 | 4/1994 | Thurman et al. | 395/600 |
| 5,313,394 | 5/1994 | Clapp | 364/419.1 |
| 5,321,831 | 6/1994 | Hirose | 395/600 |
| 5,379,373 | 1/1995 | Hayashi et al. | 395/145 X |

OTHER PUBLICATIONS

ISO/IEC DIS 10180, Information Processing-Text Communication-Standard Page Description Language; Draft International Standard 1991-03, 1991.
Adobe, Postscript Language Reference Manual, 1985, pp. 1 to 54, 160-161.

Primary Examiner—Heather R. Herndon
Assistant Examiner—Anton W. Fetting
Attorney, Agent, or Firm—Oblon, Spivak, McClelland, Maier & Neustadt

[57] ABSTRACT

A method and apparatus for efficiently processing selected pages in a hierarchically structured page description language. A stack is used to keep track of the different hierarchical levels of a document. The hierarchical levels which select pages have corresponding FIFO data structures which are used to keep track of the selected pages at the different hierarchical levels. After a selected range of pages is processed, that range of pages is popped out of the selection page range FIFO data structure. When a hierarchical level is finished being processed, the entry in the stack corresponding to that hierarchical level is popped off of the stack.

20 Claims, 23 Drawing Sheets

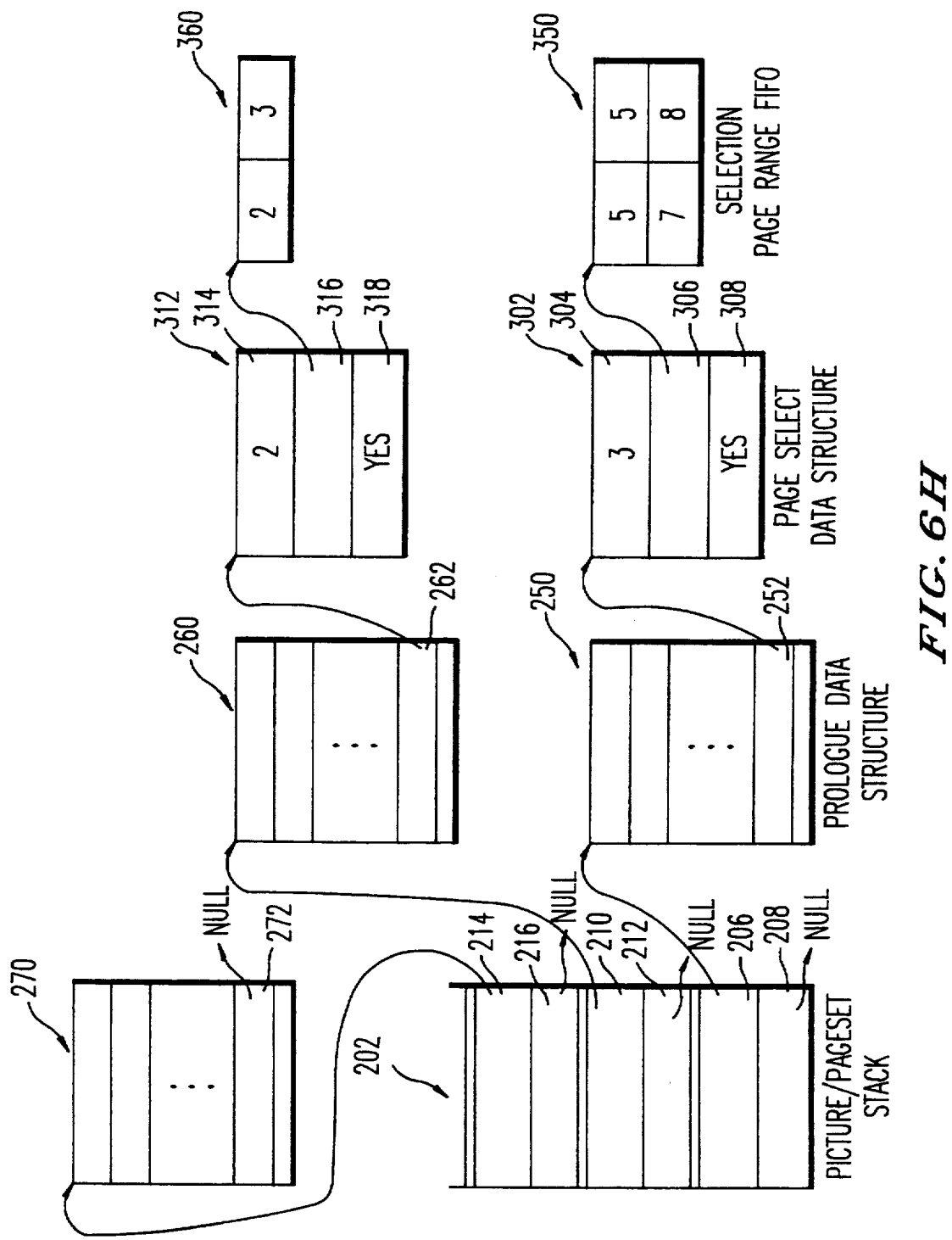

METHOD AND APPARATUS FOR PROCESSING PAGE SELECTION IN A DOCUMENT PROCESSING LANGUAGE

CROSS-REFERENCE TO RELATED APPLICATIONS

This application is a continuation-in-part of U.S. patent application Ser. No. 08/087,571 filed on Jul. 2, 1993, and entitled "Method and System to Handle Context of Interpretation in a Document Processing Language," which is a continuation-in-part of U.S. patent application Ser. No. 07/931,808 filed on Aug. 11, 1992, now U.S. Pat. No. 5,416,896, issued May 16, 1995, and entitled "A Method and System to Handle Dictionary Generation and Context Declaration in a Document Processing Language," which is a continuation-in-part of U.S. patent application Ser. No. 07/876,601 now U.S. Pat. No. 5,319,748, issued Jun. 7, 1994, and 07/876,251, now U.S. Pat. No. 5,325,484, issued Jun. 28, 1994, filed on Apr. 30, 1992, and entitled "Method and Apparatus to Manage Picture and Pageset for Document Processing" and "Method and System to Handle Inclusion of External Files into a Document Processing Language," respectively, each of which is incorporated herein by reference.

BACKGROUND OF THE INVENTION

1. Field of the Invention

This invention relates generally to computer controlled printing, displaying, or other presentation of documents which may have text, graphical components and/or images. This invention is more particularly related to a method and apparatus for processing selected pages in a hierarchically structured page description language.

2. Discussion of the Background

A Standardized Page Description Language ("SPDL") has been proposed and is being developed as an international standard by the International Standards Organization ("ISO"). The draft is known as ISO/IEC DIS 10180, labeled "Information Processing Text-Communication Standard Page Description Language" and is available through the American National Standards Institute ("ANSI") in New York, and is incorporated herein by reference. The current version of this draft is March, 1991.

One advantage of a hierarchically structured page description language is that when it is desired to have only certain pages or portions of a document printed or processed for presentation, it is not necessary to process the entire document but only portions of the document which are hierarchically above the desired portion of the document to be printed need to be processed. In contrast, a popular page description language such as PostScript® requires that the entire portion of the document appearing before the desired portion to be processed before the desired portion can be printed. For larger documents, this can amount to a significant amount of processing and communication time.

One of the required functions of a system conforming to SPDL standards as set forth in the current draft is to perform page selection in the Document Production Instruction. However, when pages are nested and the selection of pages to be presented requires pages to be selected from different hierarchical levels, it can become cumbersome to keep track of the nested levels of selected pages.

Section 6.6 of the March 1991 SPDL draft describes the high level structure elements used in SPDL. Of the three primary structure elements described in this section, the present invention is directed toward the picture and pageset. The draft SPDL standard states that a picture describes an image which can be considered as a single entity. It may be a page image or a partial page image. A pageset describes 0 or more pages.

While a page does not have its own SPDL structure element, a picture which is not subordinate to another picture is defined to be a page. Turning to FIG. 1 for an example of various pages, each picture illustrated in FIG. 1 is a page except for picture 116. All pictures except for picture 116 are subordinate to only pagesets and are not subordinate to other pictures. Therefore, each of pictures 104, 106, 112, 114, 118, 122, 124, 126, 132, and 134 are considered pages. While SPDL has detailed requirements for the picture and pageset structure elements, these details are unimportant to the understanding of the present invention.

The Applicant is not aware of any prior art systems which operate to select pages in a hierarchically structured page description language as required by SPDL. PostScript® by Adobe Systems, Inc. does not have a page selection capability. Interpress® from Xerox does have a page selection instruction, which is described in "Interpress The Source Book", pp. 352-354, 1988, published by Simon & Shuster. However, the Applicant is not aware of any prior art which shows the interaction of the page selection instruction with the hierarchical structure of a document in Interpress®.

The problem which the present invention is concerned with can be seen in FIG. 1. The highest pageset of the hierarchical structure illustrated in FIG. 1, pageset 102, has pages 1, 3, 5, 7 and 8 selected for presentation. Pageset 108 has pages 2 and 3 selected for printing. Therefore, when selected page 3 of pageset 102 is to be presented, picture 104 corresponds to page 1, picture 106 corresponds to page 2, and pageset 108 must be examined to determine which picture is page 3. Picture 112 is not page 3 of pageset 102 as pageset 108 has only pages 2 and 3 selected. The first page of pageset 108 is page no. 2 which corresponds to picture 114. Therefore, page 3 of pageset 102 is picture 114.

SUMMARY OF THE INVENTION

Accordingly, it is one object of the present invention to process a hierarchically structured page description language to determine the selected pages. It is a further object of this invention to use a stack and a FIFO data structure to efficiently process the pages for selection.

These and other objects are accomplished using a new and useful method and apparatus which processes a hierarchically structured page description language having selected pages. Each hierarchical level of the document has a corresponding entry placed in a picture/pageset stack. This entry in the picture/pageset stack is one or more pointers. One pointer of each hierarchical level points to a pageset/picture prologue data structure having information pertaining to various parameters used during the processing of the document. One entry of the pageset/picture prologue data structure is a pointer to a page select data structure. The page select data structure has an entry for a page index indicating which page is being processed, a pointer to a selection page range FIFO data structure, and an entry indicating if there has been a selection of pages.

The selection page range FIFO data structure contains two columns; the left column indicating the starting page of a range and the right column indicating the ending page of a range. If a single page has been selected, the start page and end page of the selected page will both be the number of the selected page.

Normally, the pointer to the page select data structure of the pageset/picture prologue data structure points to null. However, when a page selection within a pageset structure element is being processed, the pointer to the page select data structure does not point to null but to a page select data structure. When certain pages are selected for processing, the selection page range FIFO data structure keeps track of which pages at a particular hierarchical level are selected. After a selected page is processed, if it is a single page or a page at the end of a page range, an entry in the selection page range FIFO data structure is popped off of the FIFO.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 6A–6M illustrate the data structures created when the document illustrated in FIG. 1 is processed;

DETAILED DESCRIPTION OF THE PREFERRED EMBODIMENTS

Figure 1:
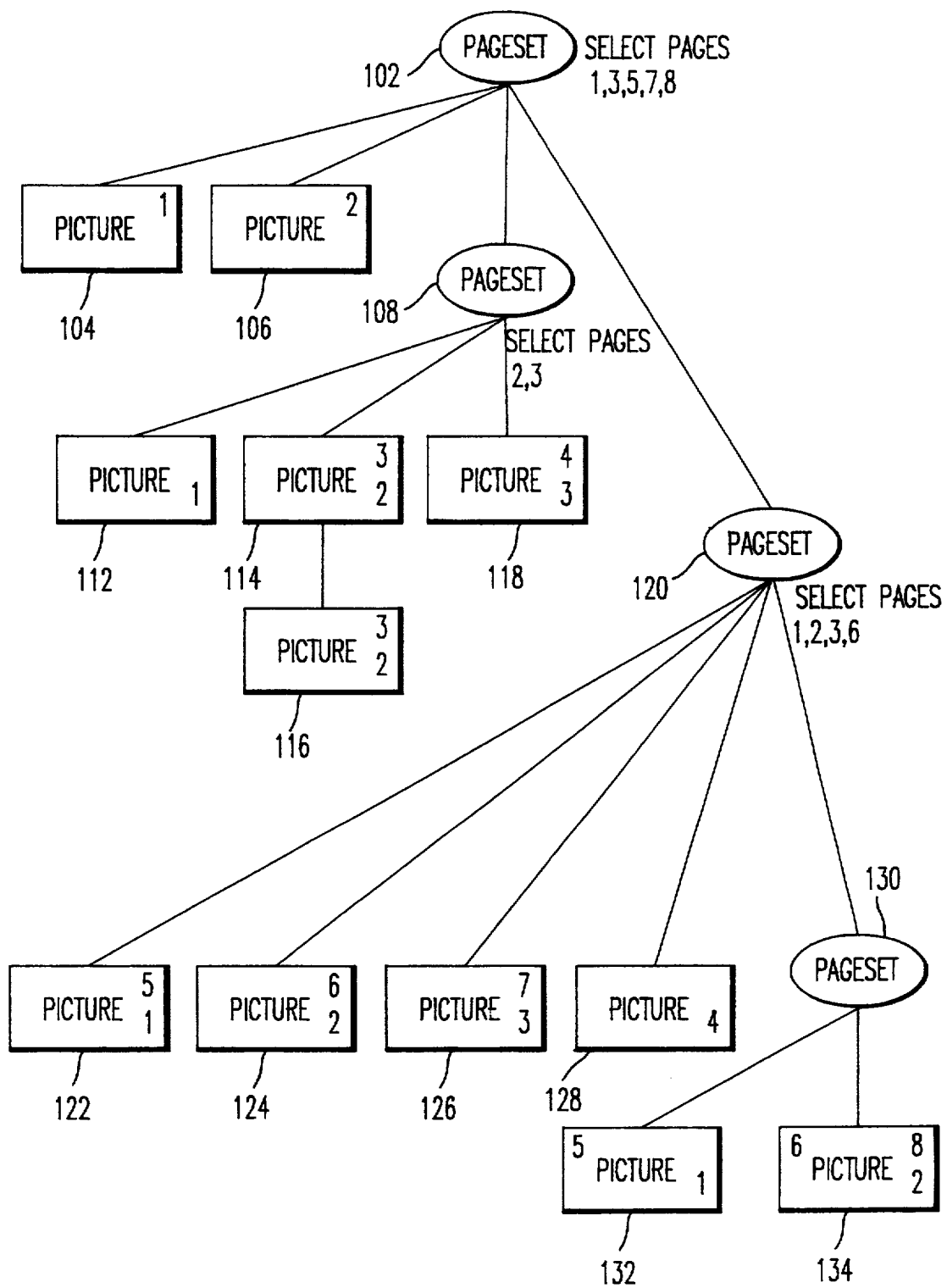
FIG. 1 illustrates a sample-SPDL document having selected pages at different hierarchical levels.

Referring now to the drawings, wherein like reference numerals designate identical or corresponding parts throughout the several views, and more particularly to FIG. 1 thereof, there is illustrated the hierarchical structure of a sample SPDL document containing page selection instructions. The purpose of FIG. 1 is to illustrate the major structure elements within an SPDL document so that the problem which the present invention overcomes can be clearly seen. Note that the structure of FIG. 1 does not illustrate a complete SPDL document but only some of the main hierarchical structure elements.

In FIG. 1, it can be seen that pageset 102 has pages 1, 3, 5, 7 and 8 selected, pageset 108 has pages 2 and 3 selected, and pageset 120 has pages 1, 2, 3 and 6 selected. There is no page selection for pageset 130. A page is a picture structure element which is not subordinate to any other pictures. For example, each of pictures 104, 106, 112, 114, 118, 122, 124, 126, 128, 132, and 134 are pages. However, picture 116 is not a page as picture 116 is subordinate to picture 114.

Pageset 102 has pages 1, 3, 5, 7 and 8 selected. Page 1 corresponds to picture 104, and page 2 (not selected) corresponds to picture 106. In FIG. 1, the number in the upper right corner of the blocks containing pictures indicates the page number relative to pageset 102. The number in the lower right corner of each picture box indicates the page number relative to the pageset immediately above the picture. To determine the subsequent selected pages of pageset 102, the pages of pageset 108 must be processed. Pageset 108 has pages 2 and 3 selected which correspond to pictures 114 and 118 respectively. The selected picture 3 of pageset 102 corresponds to the first selected page of pageset 108 which is picture 114. Picture 118 corresponds to selected page 3 of pageset 108 and page 4 (not selected) of pageset 102.

To determine selected pages 5, 7 and 8 of pageset 102, pageset 120 must be processed. Pageset 120 has pages 1, 2, 3 and 6 selected. These pages correspond to pictures 122, 124, 126 and 134, respectively. Picture 122 corresponds to selected page 5 of pageset 102 and picture 126 corresponds to selected page 7 of pageset 102. To determine selected page 8 of pageset 102, the selected pages of pageset 120 and pageset 130 must be processed. Pageset 130 does not have page selection. By default, all of the pages of pageset 130 are selected. However, pageset 120 has page selection of pages 1, 2, 3 and 6. The number in the upper left corner of pictures 132 and 134 denotes the page number relative to pageset 120. Picture 134 corresponds to selected page 6 of pageset 120 and selected page 8 of pageset 102.

If only pages 1 and 2 were selected for pageset 102, the page selection processing would be trivial and select pictures 104 and 106. However, with the nesting of the page selection instructions, processing becomes more complicated. The data structures used to keep track of the selected pages and hierarchical levels of the document will now be explained.

Figure 2:
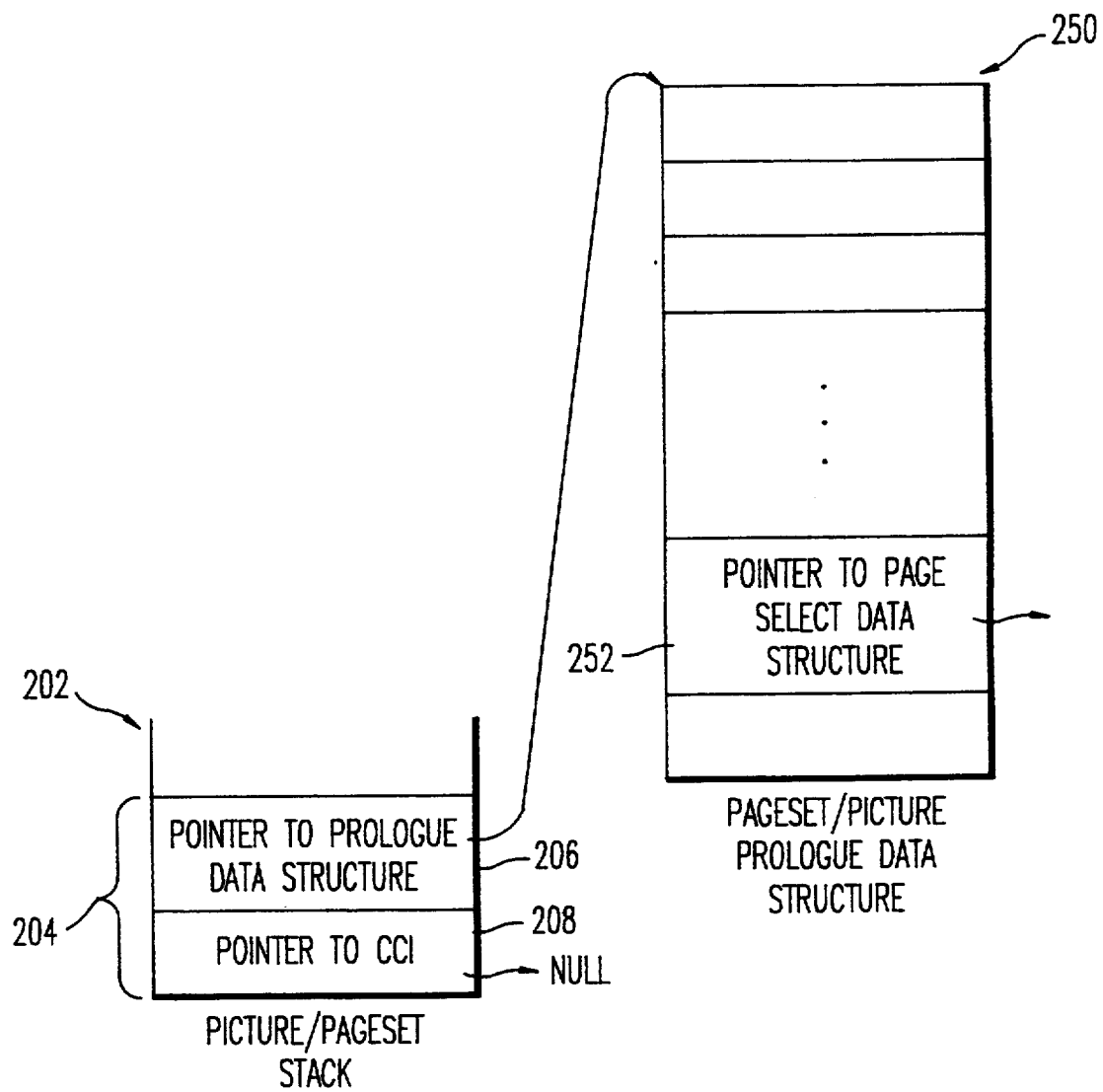
FIG. 2 illustrates a picture/pageset stack and pageset/picture prologue data structure used by the present invention.

FIG. 2 illustrates a picture/pageset stack 202 and pageset/picture prologue data structure 250. Each hierarchical level of a document being processed causes an entry such as entry 204 to be pushed onto the picture/pageset stack 202. The entry 204 of the picture/pageset stack contains a pointer to prologue data structure 206 and a pointer to a CCI data structure 208. The pointer to CCI data structure points to null unless a content portion is being processed and then points to a CCI data structure. The understanding of the operation of the CCI data structure and pointer thereto is not important to the understanding of the present invention. However, a complete explanation of the CCI data structure can be found in commonly-owned co-pending U.S. patent application Ser. No. 08/087,571, filed Jul. 2, 1993, and entitled "Method and System to Handle Context of Interpretation in a Document Processing Language." The pageset/picture prologue data structure 250 contains information pertaining to various parameters used to process a document. The entry in the pageset/picture prologue data structure which the present invention is concerned with is a pointer to page select data structure 252. This pointer points to a page select data structure when a page selection within a pageset is being processed and points to null otherwise. A detailed explanation of the operation of the picture/pageset stack and pageset/picture prologue data structure can be found in commonly-owned co-pending U.S. patent application Ser. No. 08/087,571, filed on Jul. 2, 1993, and entitled "Method and System to Handle Context of Interpretation in a Document Processing Language," which is incorporated herein by reference.

A Document Production Instruction ("DPI") is an SPDL structure element which can have a subordinate Page Selection Instruction. A DPI controls various production related instructions such as medium specification, abort policy, finishing, number of copies, and page selection. The Page Selection Instruction consists of a sequence of integer pairs which indicate start and end pages. For example, a Page Selection Instruction can have pairs such as (1,2), (5,9) and (11,11). In the above pairs, (1,2) is listed first and should be processed first. Therefore, a First In First Out (FIFO) data structure (explained below) is preferably used instead of a Last In First Out (LIFO) data structure. However, the invention is not limited to only a FIFO data structure. There can be an entry in pageset/picture prologue data structure 250, illustrated in FIG. 2, for a DPI but this has not been illustrated as it is not important to the understanding of the present invention.

Because the Page Selection Instruction is a DPI instruction, the pointer to page select data structure 252 of the pageset/picture prologue data structure 250 (also referred to as the prologue data structure) can alternatively be a pointer to a DPI data structure that contains or refers to the page select data structure. Therefore, the data structures illustrated in FIG. 2 should be considered an exemplary embodiment.

When either of the SPDL elements picture begin or pageset begin is encountered, the pointer to page select data structure 252 of the prologue data structure 250 is set to null. When a picture is being processed, the pointer to page select data structure remains pointing to null. However, when a page selection within a pageset is processed, the pointer to page select data structure 252 points to a page select data structure, as described below. When there is no page selection structure element in a DPI structure element, the pointer to page select data structure 252 is null, and all subordinate pages are selected by default.

Figure 3:
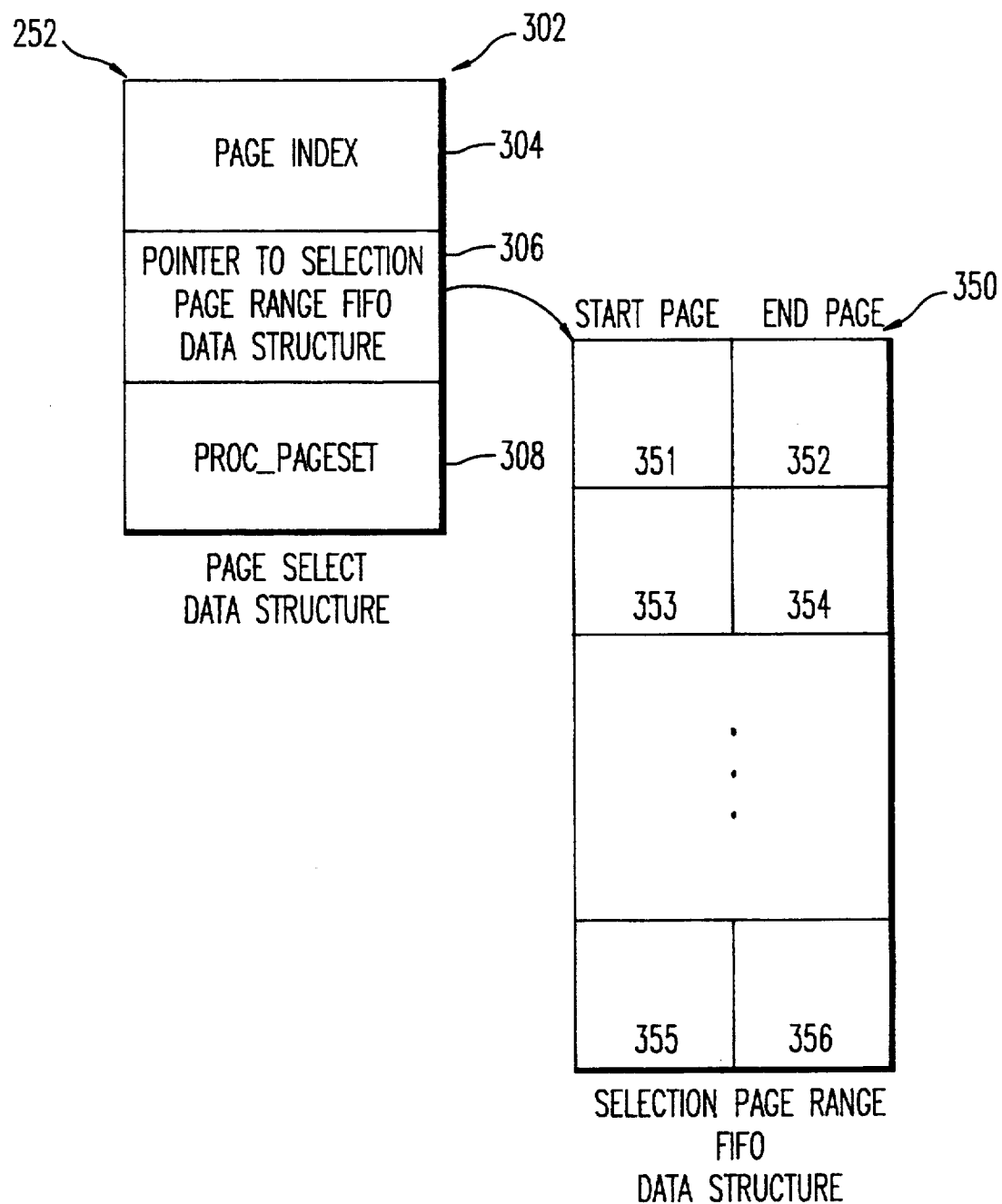
FIG. 3 illustrates the page select data structure which points to a selection page range FIFO data structure.

FIG. 3 illustrates a page select data structure 302 which is pointed to by the pointer to page select data structure 252 of the pageset/picture prologue data structure 250. A page select data structure is created upon encountering a page select structure element within a pageset structure element. Page index 304 keeps track of the particular page position in the pageset. Upon creation of the page select data structure, the page index is set to zero. A pointer to selection page range FIFO data structure 306 points to the selection page range FIFO data structure 350. If no pages are selected (i.e., a page selection structure element specifically indicates that no pages are selected), pointer 306 points to null and a selection page range FIFO data structure is not created. The entry PROC_PAGESET 308 contains the value "Yes" or "No." If the pointer to selection page range FIFO data structure (hereinafter referred to as a selection page range FIFO) points to null, indicating no pages are selected, PROC_PAGESET is equal to "No." If the pointer to selection page range FIFO 306 is not null and points to a selection page range FIFO, PROC_PAGESET is equal to "Yes." It is to be understood that in actual implementation, it is not necessary to have the entry PROC_PAGESET 308 in the page select data structure because the PROC_PAGESET entry 308 directly corresponds to the pointer 306. However, this entry, as defined above, simplifies the explanation of the operation of the process of the present invention.

The selection page range FIFO 350 contains a left column and a right column. The left column contains a starting page of a range and the right column contains the end page of the range. For example, if pages 1-3 were selected by a page selection command, entry 351 would contain page 1 and entry 352 would contain page 3. If an individual page is selected, for example page 4, the start page and corresponding end page of the column would both contain the same page (in this case, page 4). The selection page range FIFO is a FIFO data structure in that the first page(s) being processed (e.g. page 1) are initially pushed on and are also the first removed from the data structure (e.g. the first in pages are the first out). However, it is possible to use a different type of data structure which operates in a functionally equivalent manner to a FIFO data structure.

The top portion of the selection page range FIFO 350 contains the lowest page numbers which are selected and the bottom portion of the selection page range FIFO contains the highest page numbers. When the selected pages are being processed, the lowest page numbers corresponding to the top entry of the FIFO are popped off as they are being processed. If no pages are selected by a pageset, it is not necessary to create a selection page range FIFO.

Figure 4:
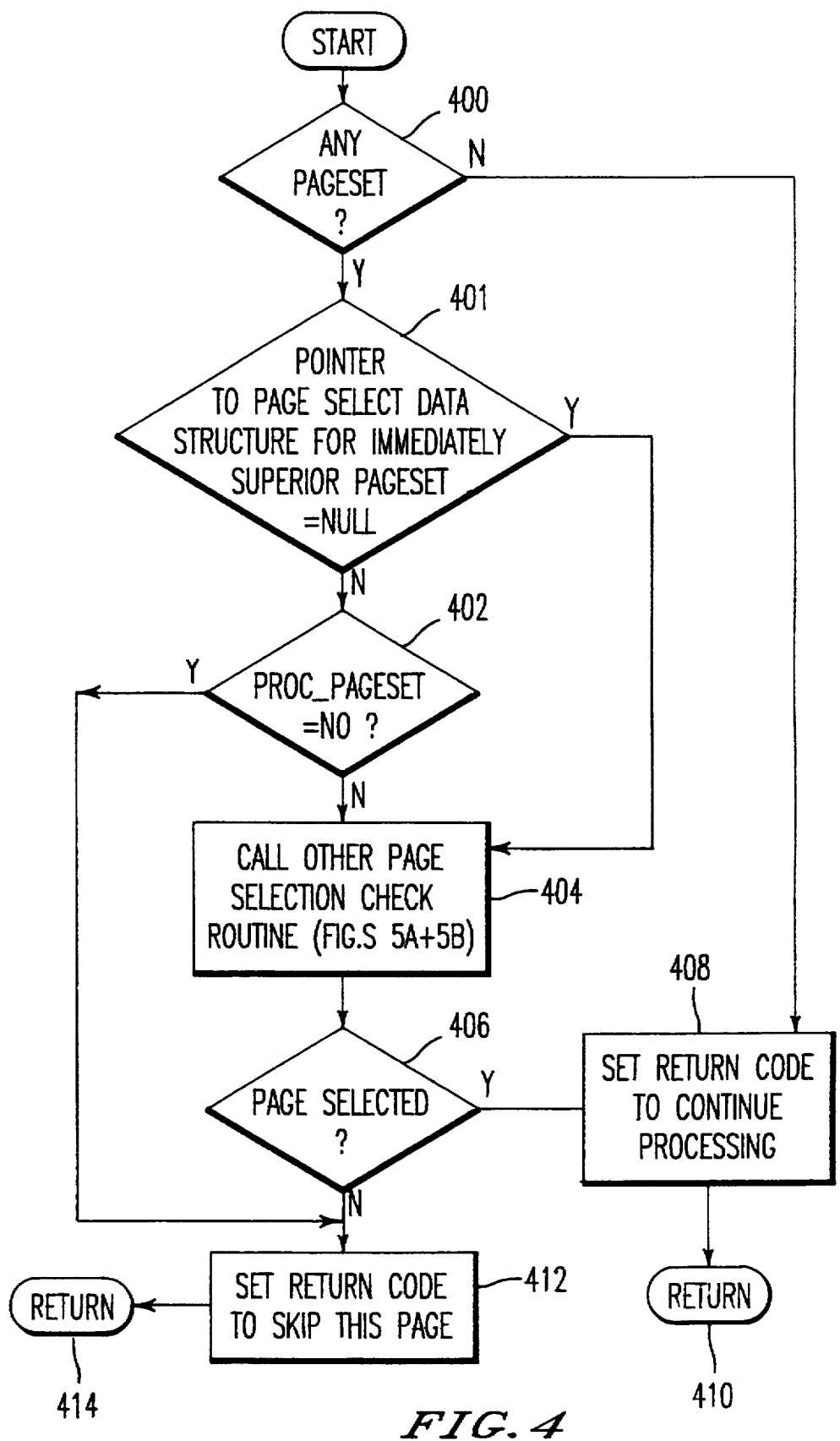
FIG. 4 illustrates a process used by the present invention each time a page is encountered to determine if the page is selected for processing.

FIG. 4 illustrates the process called when a page is encountered (when a picture begin structure element is encountered which is not subordinate to another picture). A parser/parsing process determines if there is a page by first determining the existence of a tag for the beginning of a picture. After a picture begin is encountered, it is possible to determine if the picture is a page by examining the pic_level (i.e., a picture not subordinate to other pictures is a page). This is described in commonly owned co-pending U.S. patent application Ser. No. 07/876,601, filed Apr. 30, 1992, which is incorporated herein by reference.

When a new page (a picture not subordinate to another picture) is encountered in an SPDL document, the process of FIG. 4 is called. Step 400 determines if there is a pageset. A page is always part of a pageset except for one page documents. Therefore, if there is a one page document and the page is not part of a pageset, flow will proceed from step 400 to step 408 which indicates that the page is to be processed. In other cases, there will be a pageset and flow proceeds from step 400 to step 401.

Step 401 determines if the pointer to the page select data structure for the immediately superior pageset is equal to null. If it is equal to null, all pages within the pageset are selected and flow proceeds to step 404 where additional processing is performed in the page selection check routine illustrated in FIGS. 5A and 5B, which will be discussed below. If the pointer to the page select data structure for the immediately superior pageset is not equal to null, flow proceeds to step 402 where proc_pageset is examined to determine if it is equal to "No." If proc_pageset is equal to "No" flow proceeds to step 412 where the return code indicates that the present page is to be skipped. This is because when proc—pageset is equal to "No," no pages are selected and therefore, this page must be skipped.

Figure 5A:
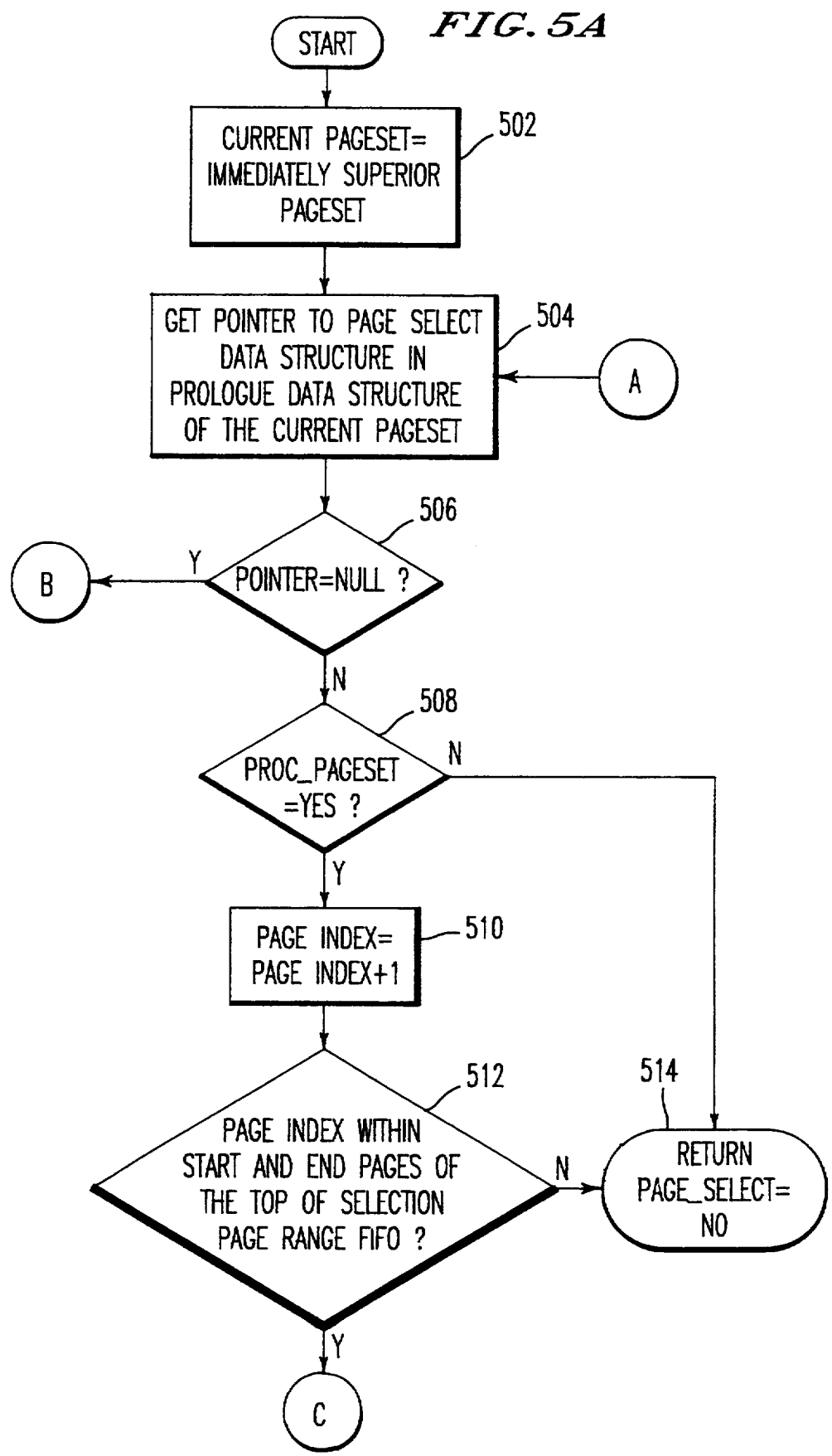
FIGS. 5A and 5B illustrate the page selection check routine called by the process illustrated in FIG. 4 to determine if a particular page was selected for processing.
Figure 5B:
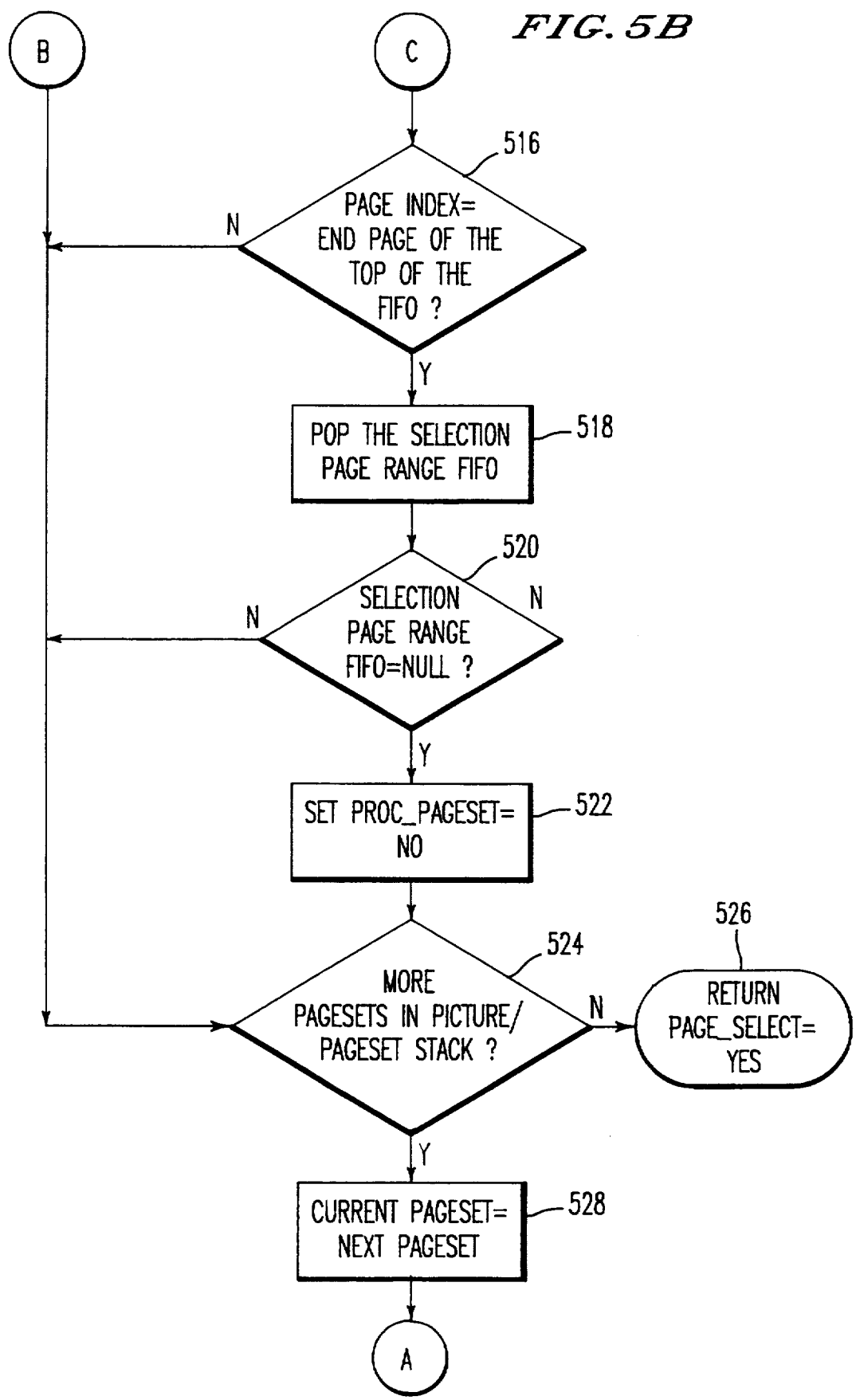

If proc—pageset is determined not to be "No" in step 402, flow proceeds to step 404 where the page selection check routine illustrated in FIGS. 5A and 5B is called.

In the process illustrated in FIG. 5A, step 502 sets the current pageset equal to the immediately superior pageset (i.e., the pageset immediately above the page being processed). Therefore, the data structures associated with the immediately superior pageset are the data structures which are to be examined and processed.

Step 504 gets the pointer to the page select data structure in the prologue data structure of the current pageset. If this pointer is determined to be null in step 506 (i.e., all pages are selected), flow proceeds to process B illustrated in FIG. 5B. If the pointer to the page select data structure is not equal to null, flow proceeds to step 508 where proc—pageset 308 in the page select data structure 302 is examined to determine if it is equal to "Yes." If proc—pageset is not equal to "Yes," no pages are selected and therefore, step 514 returns to the calling process an indication that the present page is not selected. If proc—pageset is equal to "Yes," the page index is incremented by one in step 510. As previously described, when each page select data structure is created, the page index is initially 0 and as selected pages are processed, the page index is incremented for each page.

Step 512 examines if the page index is within the start and end pages at the top of the selection page range FIFO. If the page index is not within the start and end pages, step 514 returns page—select as "No" because the page has not been selected. If the page index is within the start and end pages at the top of the selection page range FIFO, flow proceeds to process C illustrated in FIG. 5B.

In FIG. 5B, step 516 determines if the page index is equal to the end page of the top entry of the FIFO. If it is not, flow proceeds to step 524 because additional pages in the pageset are to be processed. If the page index is equal to the end page of the top entry of the FIFO, the range being processed is finished and therefore, step 516 pops the top entry off the selection page range FIFO.

Step 520 then determines if the selection page range FIFO is equal to null. If it is, there are no entries left on the selection page range FIFO and therefore, step 522 sets proc—pageset equal to "No." Also, the pointer to selection page range FIFO points to null as the selection page range FIFO no longer exists. From step 506 of FIG. 5A, steps 516, 520 and 522 of FIG. 5B, step 524 determines if there are additional pagesets in the picture/pageset stack (i.e., pagesets which are in the hierarchy of the present page which are above the immediately superior pageset of the page). If there are not, processing of the current page is finished and page—select is returned to the calling process as "Yes" because the page is selected. If there are additional pagesets to be processed, step 528 sets the current pageset to the next pageset which is hierarchically above the pageset which has just been processed and flow proceeds to step 504 illustrated in FIG. 5A.

After termination of the process illustrated in FIGS. 5A and 5B, step 406 of FIG. 4 is executed which determines if the page was selected by looking at the returned variable page—select. If it was selected, step 408 sets a return code to continue processing of the page and if it was not selected, step 412 sets a return code to skip the processing for the present page.

Figure 6A:
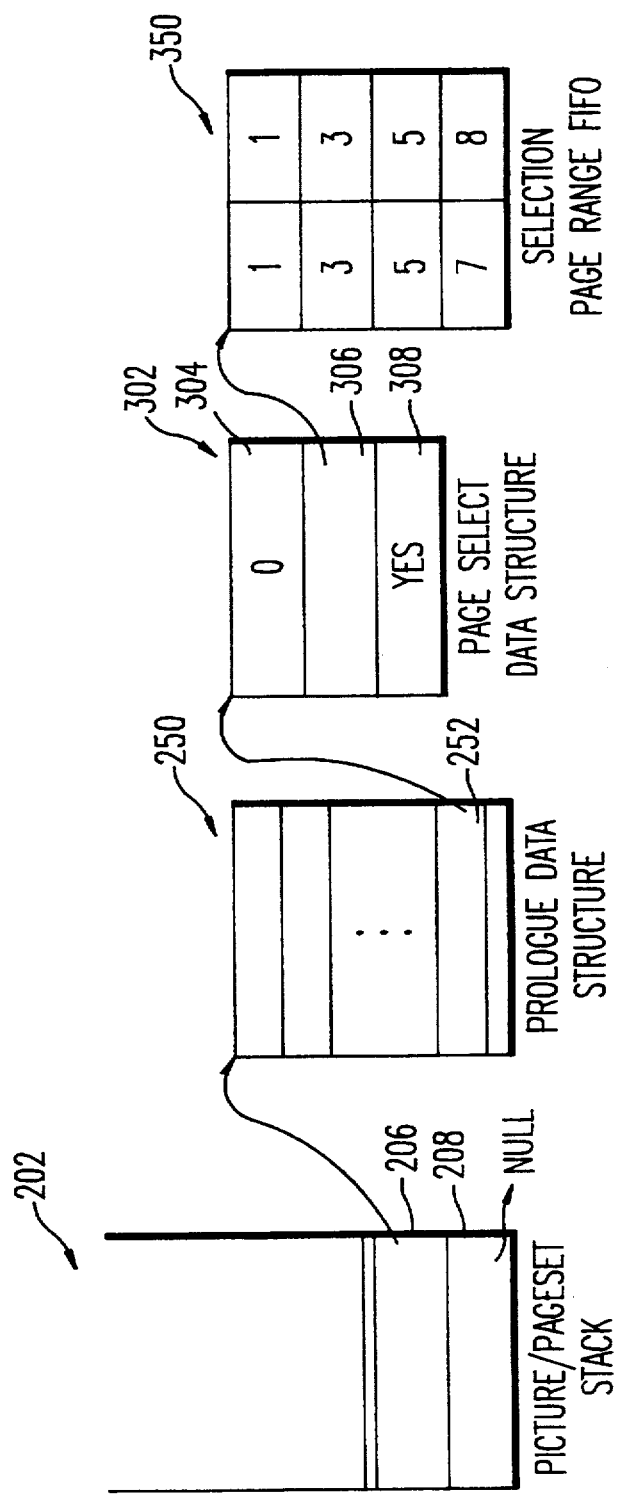

Now that the data structures used by the present invention and the process used by the present invention have been described, the data structures created as the present invention is processing the structure illustrated in FIG. 1 will now be described. FIG. 6A illustrates the data structures after pageset 102 of FIG. 1 has been processed. The picture/pageset stack 202 has a pointer to prologue data structure 206 pointing to a prologue data structure 250. The prologue data structure 250 has a pointer to page select data structure 252 pointing to the page select data structure 302. As no processing of the pageset has yet been performed, the page index for page select data structure 302 is set to 0. Pointer 306 points to the selection page range FIFO 350 which reflects that pages 1, 3, 5, 7 and 8 are selected. As pointer 306 does not point to null, the PROC—PAGESET entry 308 of the page select data structure 302 is set equal to "Yes," as illustrated in FIG. 6A.

Next, picture 104 of FIG. 1 is encountered and an entry is placed on the picture/pageset stack having the pointer to prologue data structure 210 point to the prologue data structure 260 and the pointer 212 to the CCI data structure points to null. A prologue data structure 260 is created for the picture 104 and as element 104 is a picture, pointer 262 which points to a page select data structure is set to point to null.

Then, the process illustrated in FIG. 4 is called. Because there is the pageset 102, flow proceeds from step 400 to step 401. In step 401, the pointer 252 to the page select data structure is determined to not equal null and therefore, flow proceeds to step 402. In step 402, proc—pageset 308 in the page select data structure 302 is not equal to "No," and therefore, the process illustrated in FIGS. 5A and 5B is called.

Figure 6B:
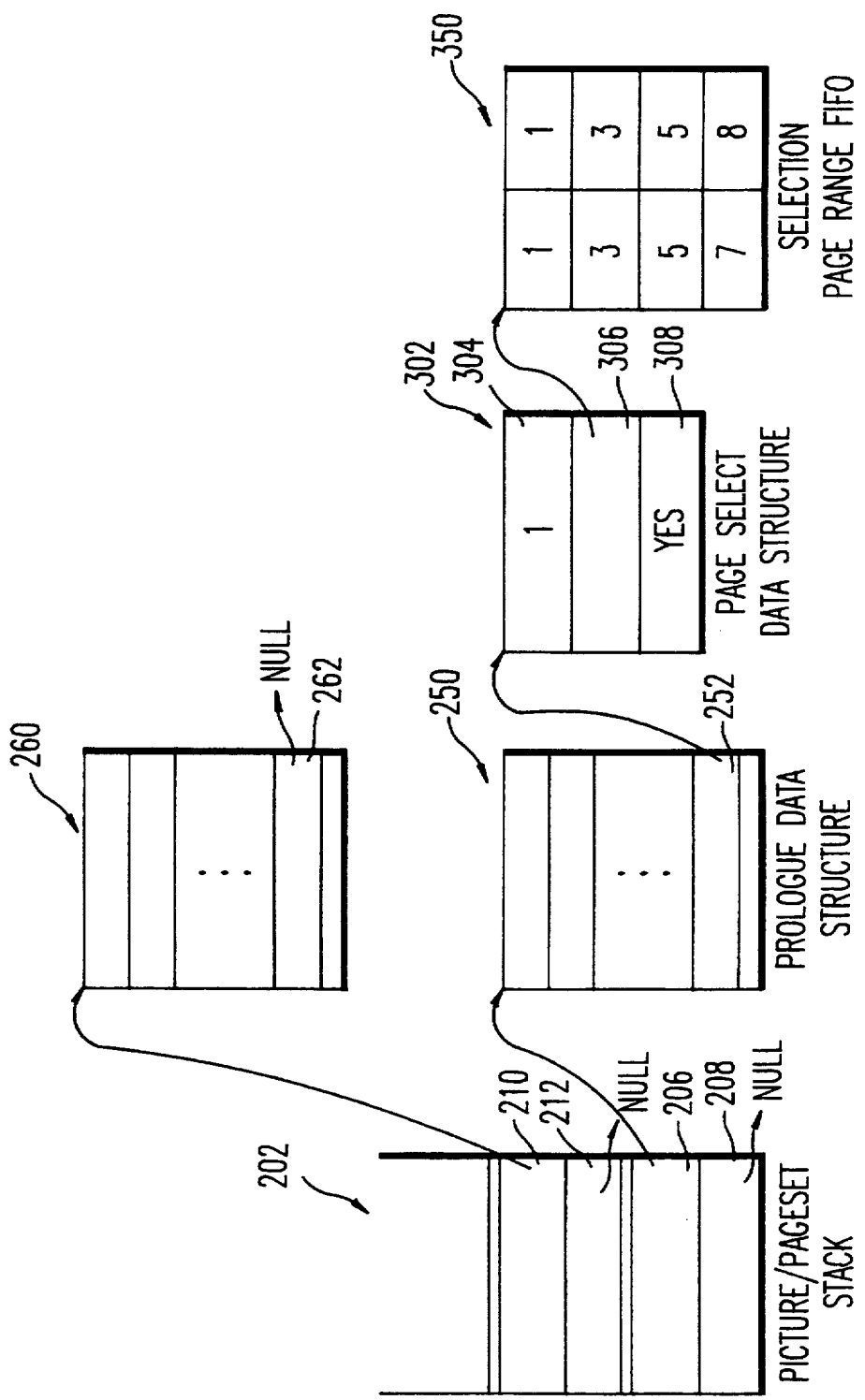

In FIG. 5A, step 502 sets the pageset 102 as the current pageset and step 502 gets the pointer to the page select data structure 252 of the pageset 102. Step 506 then determines that the pointer 252 is not equal to null and step 508 then examines proc—pageset 308 and step 510 increments the page index to 1. The data structures are as illustrated in FIG. 6B.

Figure 6C:
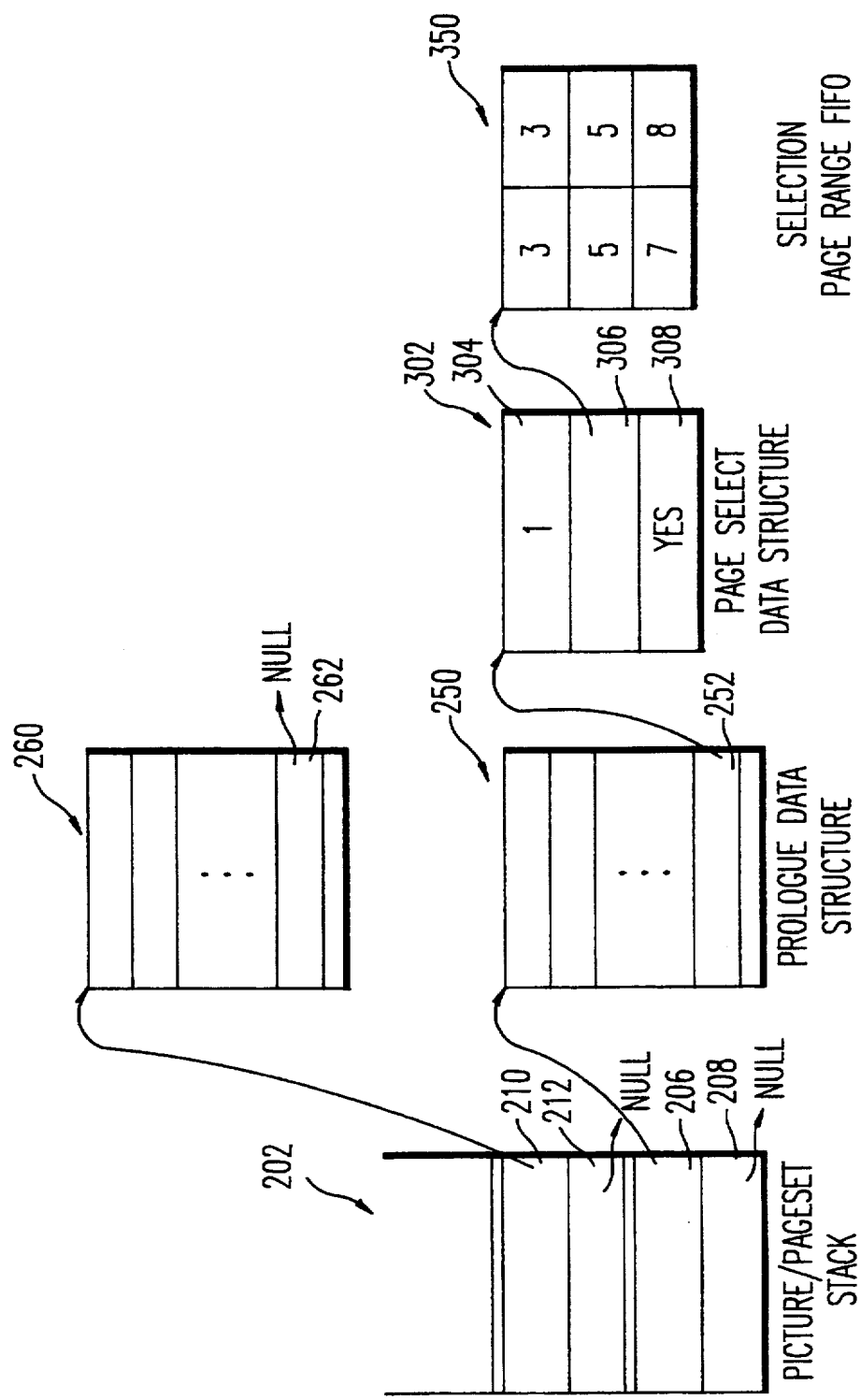

Step 512 determines that the page index, which is equal to 1, is between the start page 1 and end page 1 at the top of the selection page range FIFO 350. Flow then proceeds to step 516 and the page index is determined to be equal to the end page at the top of the FIFO. Therefore, the top entry of the selection page range FIFO 350 is popped off in step 518 and the data structures are now as illustrated in FIG. 6C.

Step 520 determines that the selection page range FIFO is not equal to null and flow proceeds to step 524. There are no other superior pagesets in the picture/pageset stack and therefore, step 526 returns the page select variable as "Yes." Flow returns to step 406 in FIG. 4 and step 408 sets the return code to continue processing. Therefore, the structure elements which make up picture 104 (not illustrated, such as content portions appearing in tokensequence elements) are processed.

After picture 104 and any elements subordinate thereto (not illustrated) are finished being processed, the prologue data structure corresponding to picture 104 is deleted and the entry of the picture/pageset stack containing the pointers 210 and 212 are popped off the picture/pageset stack.

Next, picture 106 is processed. An entry is placed on the picture/pageset stack corresponding to picture 106 having a pointer 210 to prologue data structure 260 and a pointer 212 pointing to null. Note that in the present application, particular data structures at a particular hierarchical level have the same reference numerals throughout processing, even though different structure elements are being processed. For example, the entry on the picture/pageset stack and the prologue data structure for pictures 104 and 106 will have the same reference numerals because they are at the same hierarchical level.

Figure 6D:
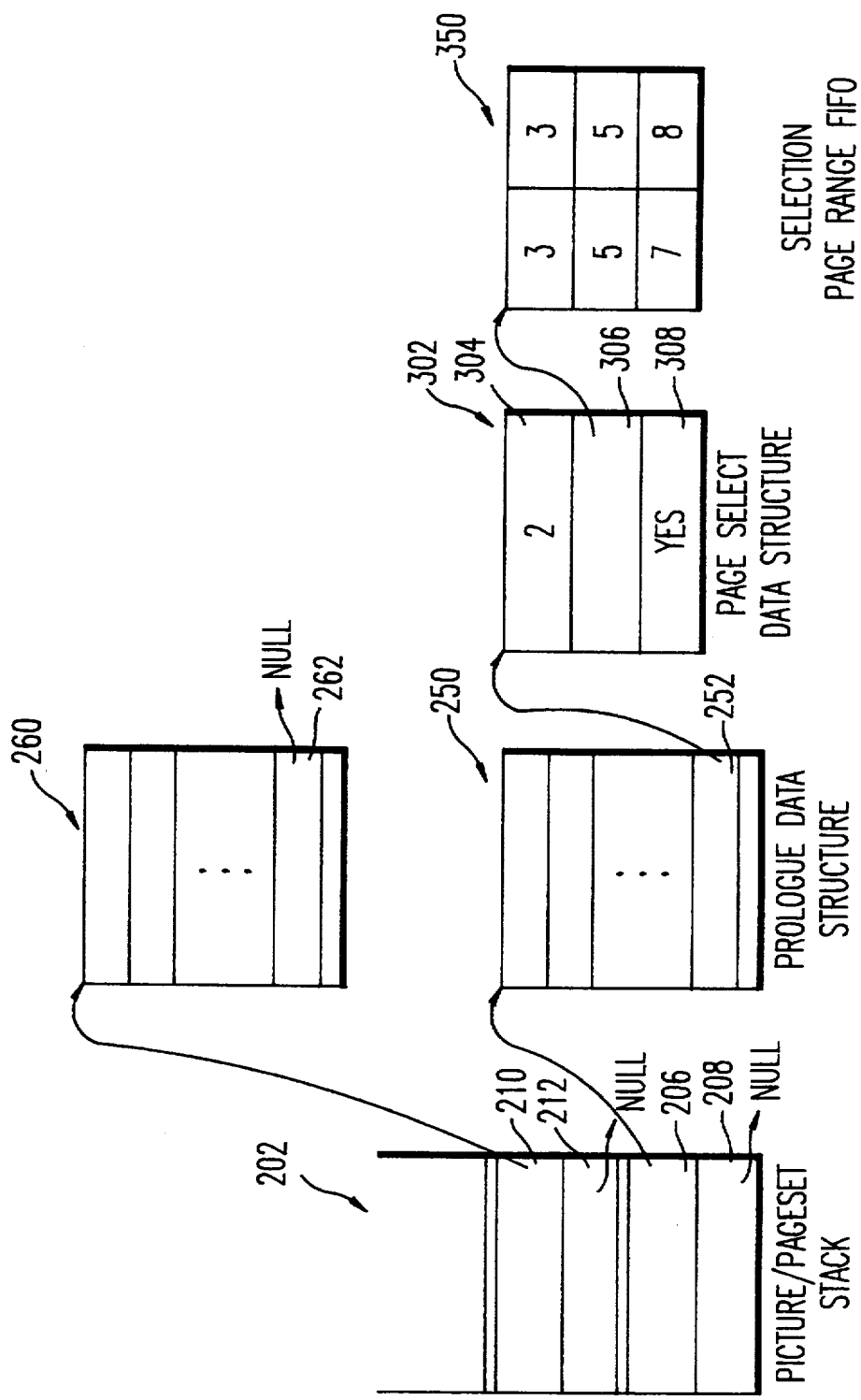

When processing picture 106, flow proceeds from step 400 to step 401 to step 402 which determines that proc_pageset 308 is equal to "Yes." Flow then proceeds to the process illustrated in FIG. 5A where pageset 102 is set equal to the current pageset in step 502. Step 504 gets the pointer to page select data structure 252 and step 506 determines that pointer 252 is not equal to null. Step 508 determines the proc_pageset 308 is equal to "Yes" and therefore, page index 304 is incremented from 1 to 2 as illustrated in FIG. 6D.

Step 512 determines that the page index 304 is not between the start and end pages of the top entry of the selection page range FIFO and therefore, flow proceeds to step 514 where page_select is set equal to "No." Flow proceeds to step 406 in FIG. 4. The page corresponding to picture 106 is not selected and therefore, step 412 sets the return code indicating that the page corresponding to picture 106 is to be skipped. Accordingly, the elements which are subordinate to picture 106 (not illustrated) are not processed and the entry in the picture/pageset stack having pointers 210 and 212 is popped off of the picture/pageset stack 202.

Figure 6E:
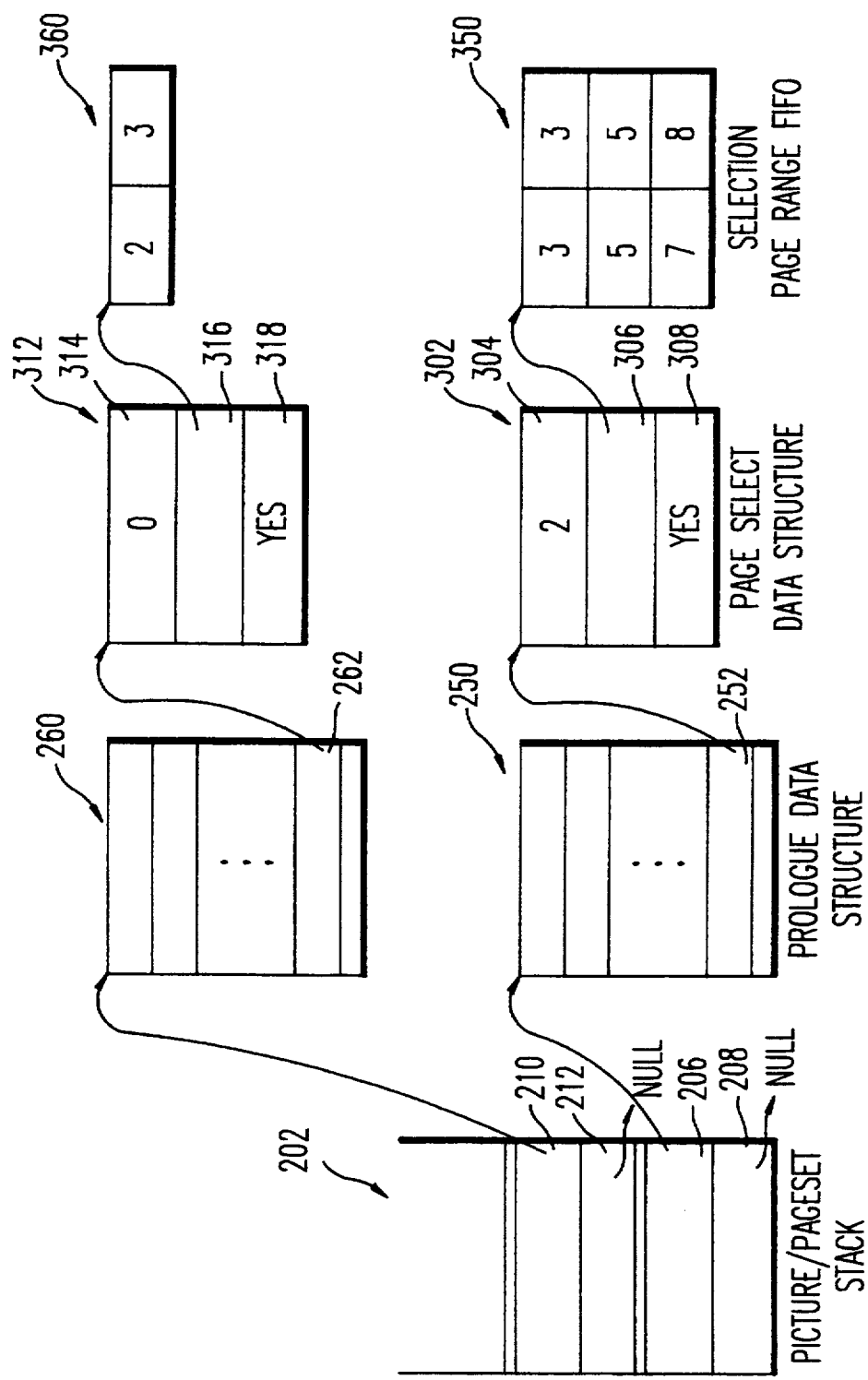

Next, pageset 108 is processed and an entry is pushed onto the picture/pageset stack containing pointers 210 and 212. The pointer 262 which points to the page select data structure points to a page select data structure 312 having default values as element 108 is a pageset. A selection page range FIFO 360 is created which indicates that pages 2 and 3 of pageset 108 are selected. The data structures are now as illustrated in FIG. 6E.

Next, the page corresponding to picture 112 is processed. An entry is placed on the picture/pageset stack containing pointers 214 and 216. Pointer 214 points to prologue data structure 270 which has pointer 272 pointing to null and not a page select data structure as element 112 is a picture. The process illustrated in FIG. 4 is called and flow proceeds from steps 400, 401, and 402 to step 404 where the process illustrated in FIGS. 5A and 5B is called.

Figure 6F:
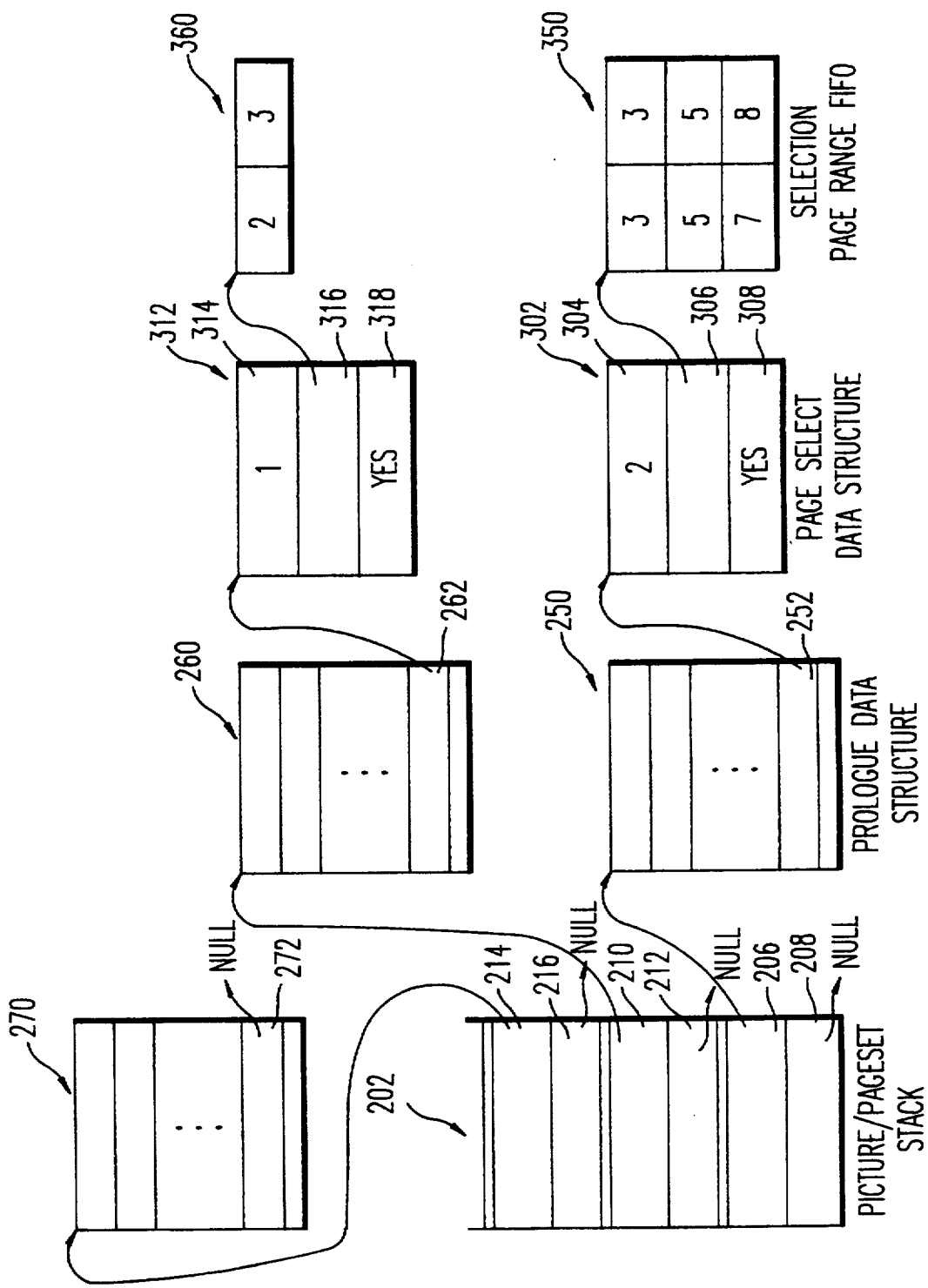

In FIG. 5A, step 502 sets the current pageset as pageset 108. Step 504 gets the pointer to page select data structure 262 and step 506 determines that pointer 262 is not equal to null. Step 508 determines that proc_pageset 318 is not equal to null and the page index 314 is incremented from 0 to 1. The data structures are now as illustrated in FIG. 6F.

Step 512 determines that the page index 314 is not between the start and end pages of the top entry of the selection page range FIFO 360 and therefore, step 514 returns page_select as "No." Step 406 determines that the page is not selected and therefore, step 412 sets the return code to skip this page. Then, the prologue data structure 270 is deleted and the entry of the picture/pageset stack containing pointers 214 and 216 is popped off of the stack.

Next, picture 114 is processed and an entry is pushed onto the picture/pageset stack 202 containing pointers 214 and 216. The pointer to prologue data structure 214 points to prologue data structure 270. The pointer 272 of the prologue data structure points to null and not a page select data structure because element 114 is a picture. Then the process illustrated in FIG. 4 is called and flow proceeds to step 506 of FIG. 5 and the pointer 262 is determined not to be null. Step 508 determines that proc_pageset 318 is equal to "Yes" and therefore, the page index 314 is incremented from 1 to 2 in step 510. Step 512 then determines that the page index 314 is between 2 and 3 and flow proceeds to process C illustrated in FIG. 5B.

In FIG. 5B, step 516 determines that page index 314 is not equal to the end page, 3, of the top of FIFO 360 and flow proceeds to step 524. Step 524 determines that there is an additional pageset (pageset 102 corresponding to the bottom entry in picture/pageset stack 202, and therefore, step 528 sets the current pageset equal to the pageset corresponding to the bottom entry in the picture/pageset stack.

Figure 6G:
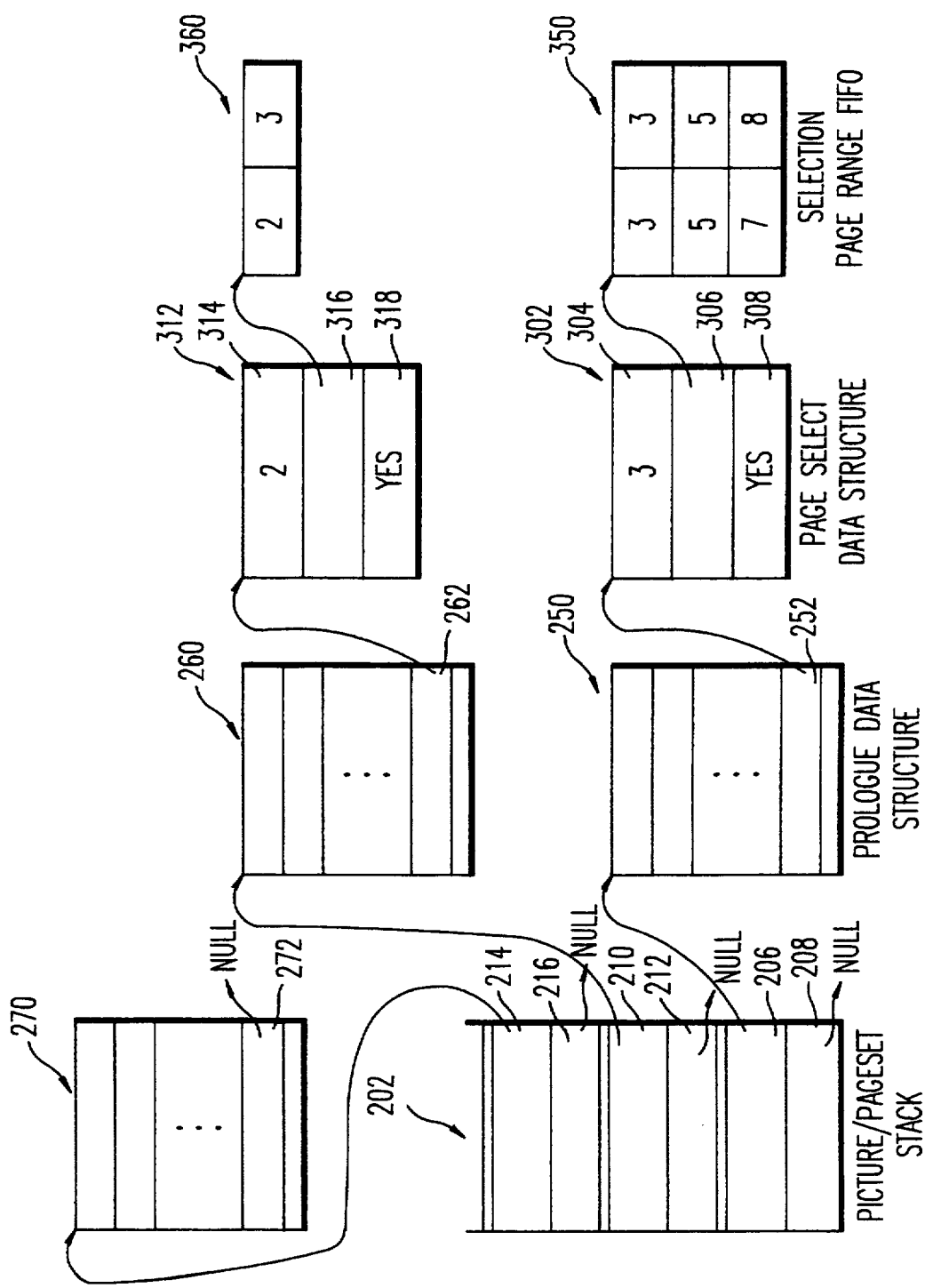
Figure 61:
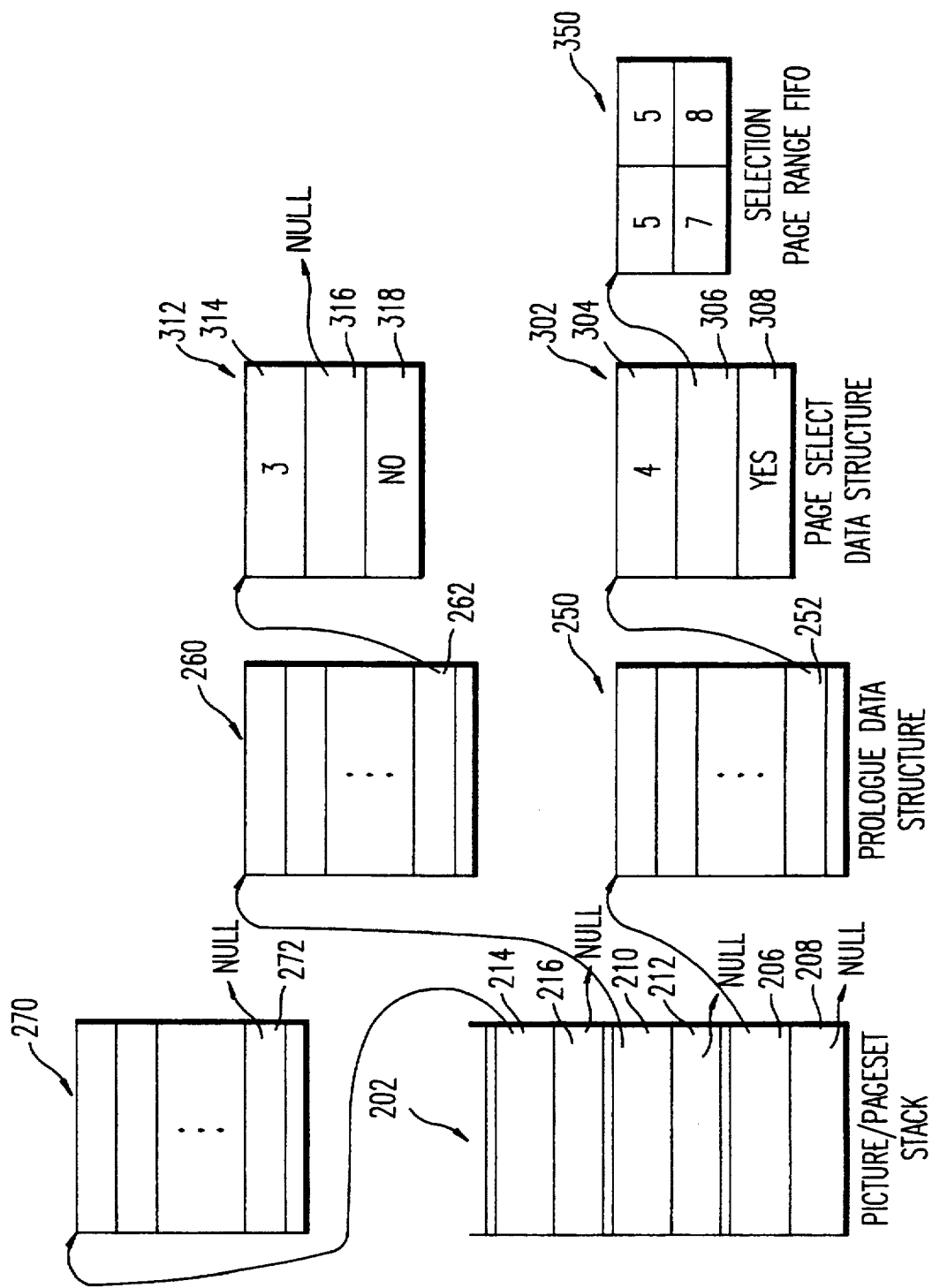

Flow proceeds to step 502 where the pointer 252 is obtained and step 506 determines that the pointer is not equal to null and step 508 determines that proc_pageset 308 is not equal to null. Therefore, page index 304 is incremented from 2 to 3. The data structures are now as illustrated in FIG. 6G.

Flow proceeds to step 516 which determines that the page index 304 is equal to the end page, 3, of the top of FIFO 350 and therefore, the top entry in the selection page range FIFO 350 is popped off in step 518. The data structures are now as illustrated in FIG. 6H.

Step 520 determines that the selection page range FIFO is not equal to null and flow proceeds to step 524 which determines that there are no more pagesets in the picture/pageset stack and therefore, step 526 returns page_select as "Yes." Step 406 in FIG. 4 determines that the page has been selected and therefore, step 408 sets the return code to continue processing and the structure elements under picture 114 including picture 116 are processed. After processing picture 114 and picture 116, the prologue data structure 270 is deleted and the top entry in the picture/pageset stack having pointers 214 and 216 are popped off of the stack.

Next, picture 118 is processed. Upon encountering picture 118, an entry is pushed onto the picture/pageset stack 202 having pointers 214 and 216. Pointer 214 points to a created prologue data structure 270. The process illustrated in FIG. 4 is called and flow proceeds to FIGS. 5A and 5B where pageset 108 is set as the current pageset and the pointer to page select data structure 262 is examined and step 506 determines that it is not equal to null. Step 508 determines that proc_pageset 318 is equal to "Yes" and page index 314 is incremented from 2 to 3 in step 510. Step 512 determines that the page index 314 is between 2 and 3 in FIFO 360 and flow proceeds to step 516 which determines that the page index is the end page of FIFO 360. Flow proceeds to step 518 where the top entry of the selection page range FIFO of page select data structure 312 is popped off. As this was the only remaining entry for the FIFO, the FIFO is null and therefore, step 522 sets proc_pageset 318 equal to "No." Step 524 determines that there are more pagesets (i.e., the pageset corresponding to pageset 102) and therefore, step 528 sets the current pageset as the pageset corresponding to pageset 102 which corresponds to the bottom entry in the picture/pageset stack 202.

Flow proceeds to step 504 which gets pointer 252 and step 506 determines that pointer 252 is not equal to null. Step 508 examines proc_pageset 308 and determines that it is equal to "Yes" and therefore, page index 304 is incremented from 3 to 4. The data structures are now as illustrated in FIG. 6I.

Step 512 determines that page index 304 is not between the start page 5 and end page 5 and therefore, step 514 returns page_select as "No" and step 412 sets the return code to indicate that picture 118 is to be skipped.

As there are no further structure elements under pageset 108, pageset 108 is finished being processed. Consequently, the prologue data structure 260 and page select data structure 312 are deleted and the entry on the picture/pageset stack 202 having pointers 210 and 212 are popped off of the stack.

Figure 6J:
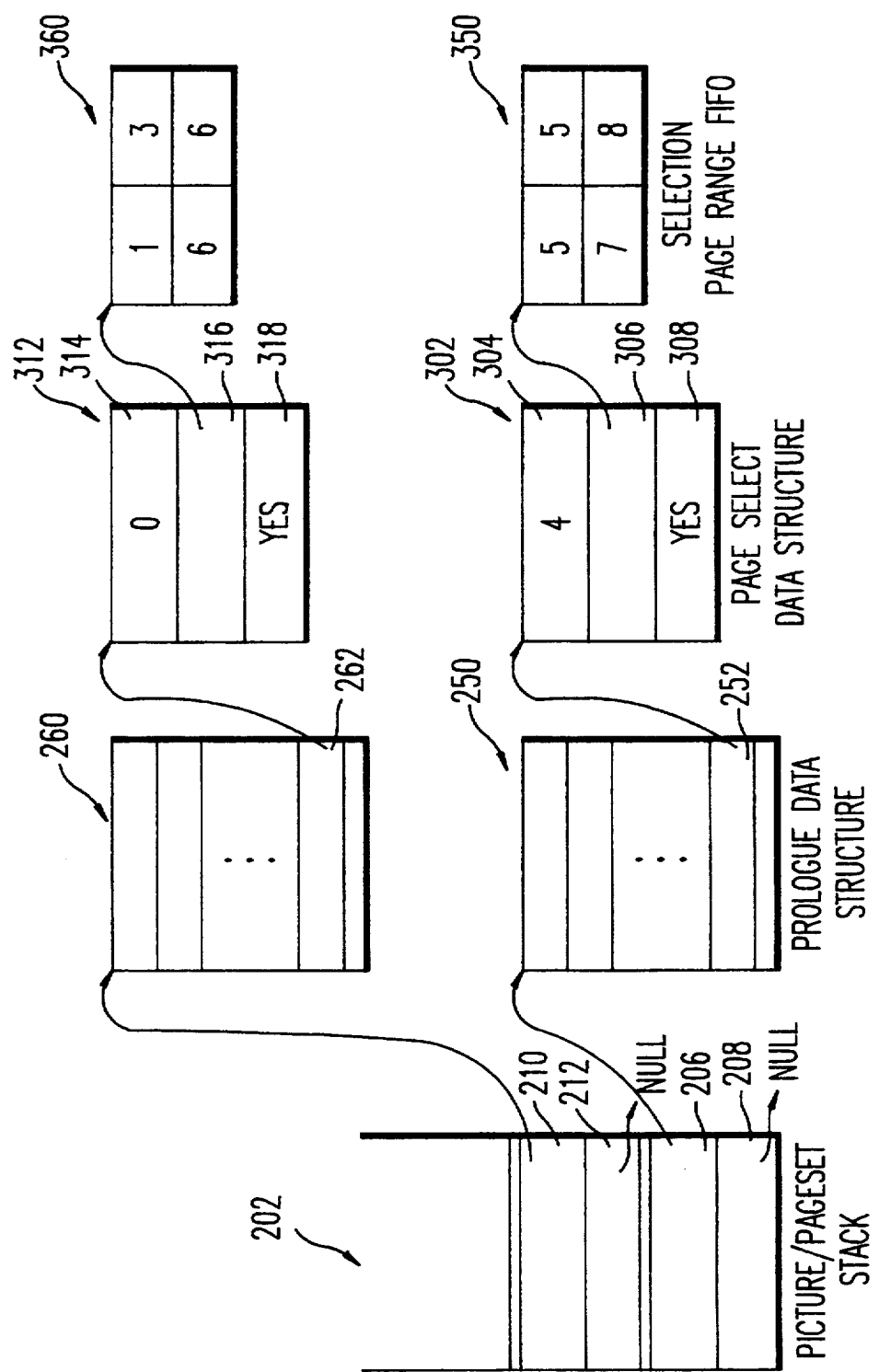

Next, pageset 120 is processed. Upon encountering the pageset 120 with selected pages 1, 2, 3, and 6, an entry is placed on the picture/pageset stack having pointers 210 and 212. A prologue data structure 260 is created having a pointer to page select data structure 262 point to a created page select data structure 312 having a page index 314 of 0, proc_pageset 318 equal to "Yes," indicating that pages have been selected, and a selection page range FIFO 360 having two entries. The first entry in the FIFO indicates page 1 is the starting page and page 3 is the ending page of the selected range and the second entry indicates page 6 is selected. The data structures are as illustrated in FIG. 6J.

Next, picture 122 is processed and therefore, an entry is pushed on the picture/pageset stack 202 having pointers 214 and 216. Because the element 122 is a picture, the pointer to page select data structure 272 of prologue data structure 270 points to null. Next, the process illustrated in FIG. 4 is called and flow proceeds to the process illustrated in FIGS. 5A and 5B where pageset 120 is set as the current pageset, step 504 gets pointer 262 and step 506 determines that pointer 262 is not equal to null. Step 508 determines that proc_pageset is equal to "Yes" and therefore, page index 314 is incremented from 0 to 1. Step 512 determines that the page index 314 is within the start and end pages at the top entry of the selection page range FIFO 360 and flow proceeds to step 516 of FIG. 5B.

Figure 6K:
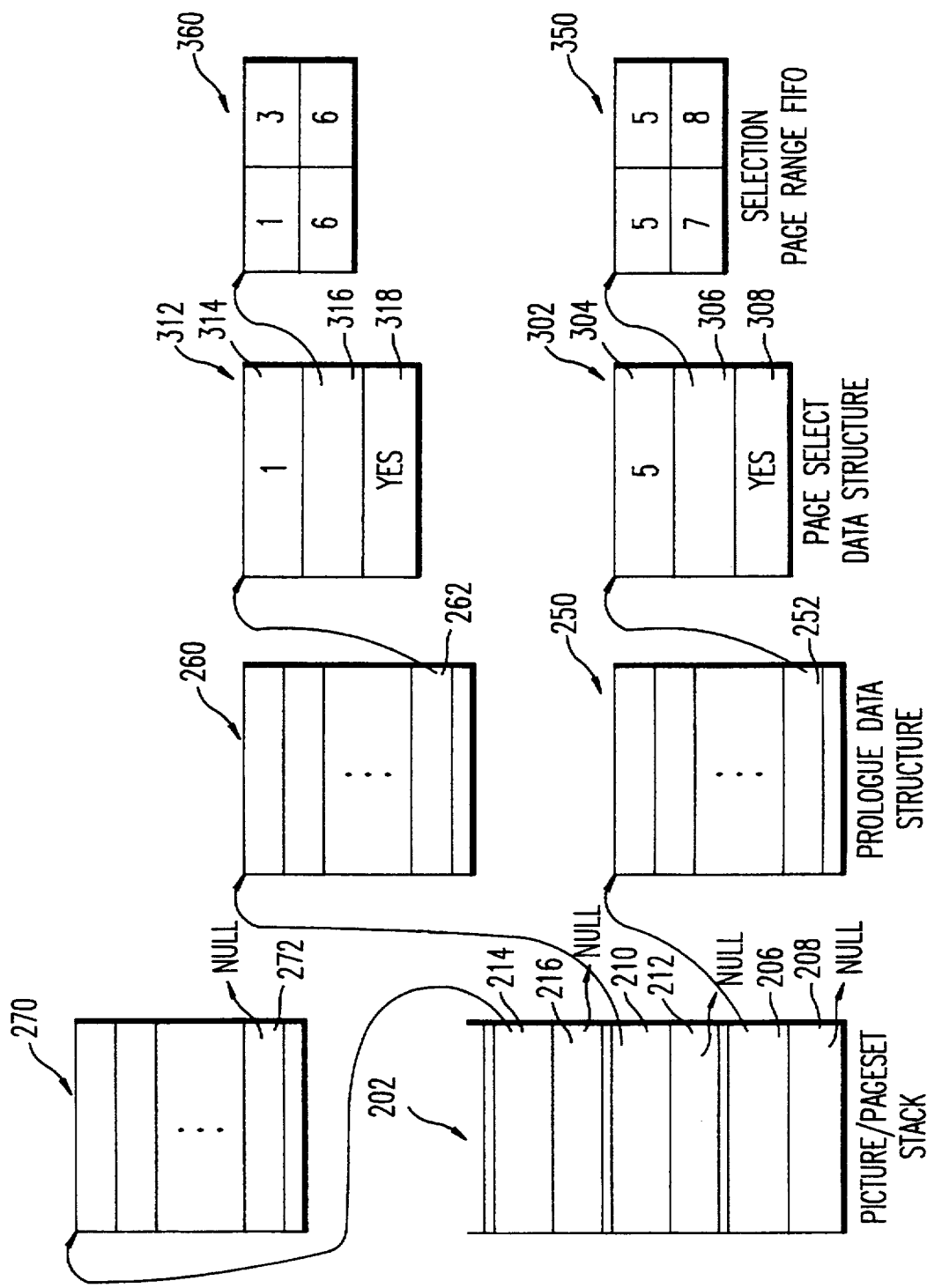
Figure 79:
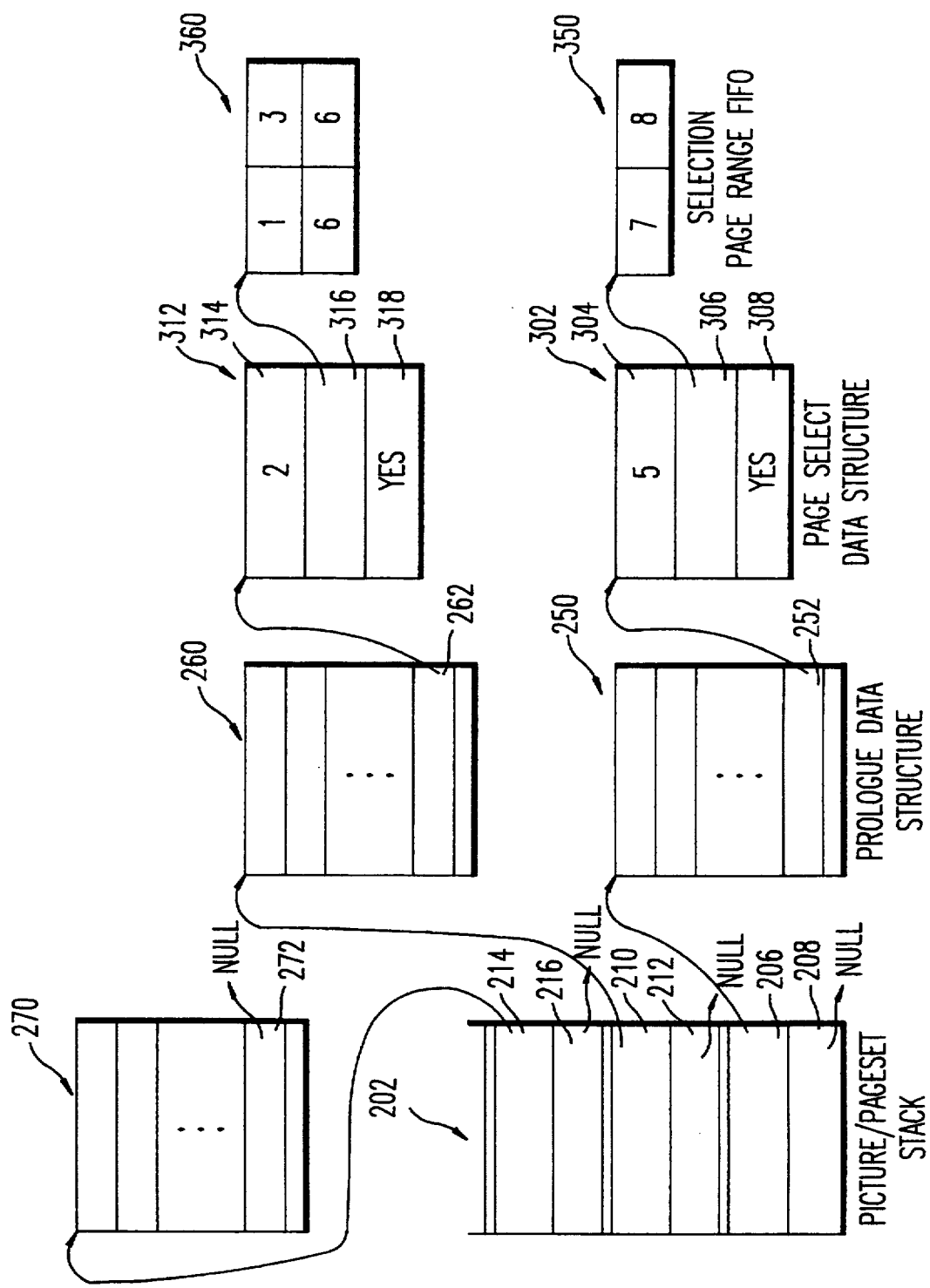

Step 516 determines that the page index is not equal to the end page and flow proceeds to step 524 which determines that there are more pagesets in the picture/pageset stack (the pageset corresponding to pageset 102). The pageset corresponding to pageset 102 is set as the current pageset in step 528 and flow proceeds to step 504 of FIG. 5A. Step 504 gets pointer 252 and step 506 determines that it is not equal to null. Step 508 determines that proc_pageset 308 is equal to "Yes" and therefore, step 510 increments page index 304 from 4 to 5. The data structures are now as illustrated in FIG. 6K.

Step 512 determines that page index 304 is within the start and end pages of the top section of FIFO 350 and step 516 determines that the page index 304 is equal to the end page of FIFO 350 and therefore, step 518 pops the top entry off page range FIFO 350. The FIFO 350 is not equal to null and therefore, flow proceeds from step 520 to step 524 which determines there are no more pagesets in the picture/pageset stack 202 and step 526 returns page_select as "Yes."

Step 406 determines that the page is selected and step 408 sets the return code to continue processing of the page. After processing picture 122, the prologue data structure is deleted and the entry corresponding to pointers 214 and 216 on the picture/pageset stack 202 is popped off of the stack.

Next, picture 124 is processed and an entry is pushed onto the stack having pointers 214 and 216 and prologue data structure 270 is created. The process illustrated in FIG. 4 is called and flow proceeds to FIG. 5 where step 508 determines that PROC_PAGESET 318 is equal to "Yes" and page index 314 is incremented from 122 and the data structures are as illustrated in FIG. 6L.

Figure 6M:
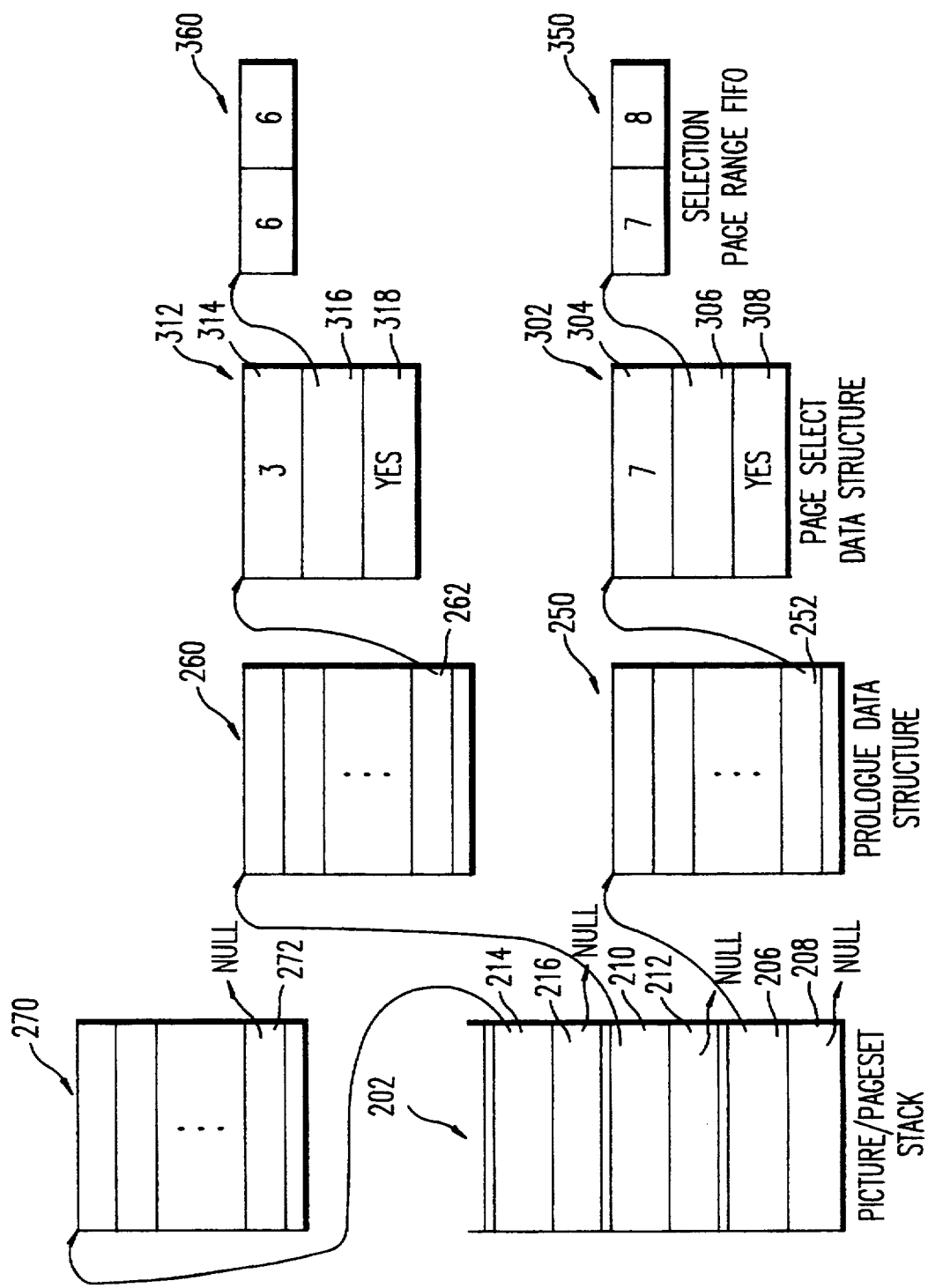

After processing picture 124, picture 126 is processed and the page index 314 is incremented from 2 to 3 and the page index 304 is incremented from 6 to 7 and the data structures are as illustrated in FIG. 6M.

The description of the processing of pageset 130 and pictures 132 and 134 is omitted for brevity's sake as the processing of the structure elements is performed in a similar manner as the processing for the previously-described structure elements using the flowcharts illustrated in FIGS. 4 and 5. It is to be noted that when pageset 130 is processed, since there are no specifically selected pages, by default, each of the pages is selected. Therefore, the prologue data structure for pageset 130 will have its pointer to page select data structure point to null. When step 506 of FIG. 5A is encountered, flow will proceed to step 524 of FIG. 5B. As there is no page select data structure or selection page range FIFO for pageset 130, during processing of pageset 130, steps 508–522 will be skipped.

Figure 7:
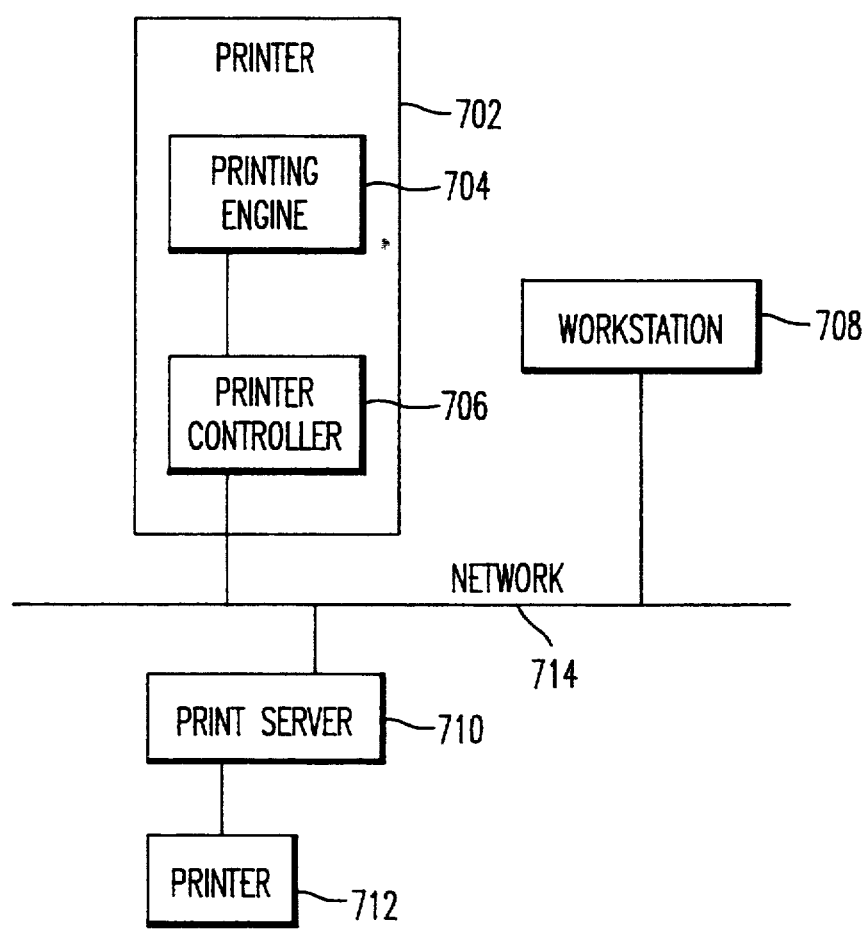
FIG. 7 illustrates a computer network for employing the present invention.

FIG. 7 illustrates a network and various devices connected thereto, any of which can employ the present invention. Connected to the network 714 is a printer 702 having a printer controller 706 and a printing engine 704. Workstation 708 is also connected to the network along with print server 710 connected to printer 712.

Figure 8:
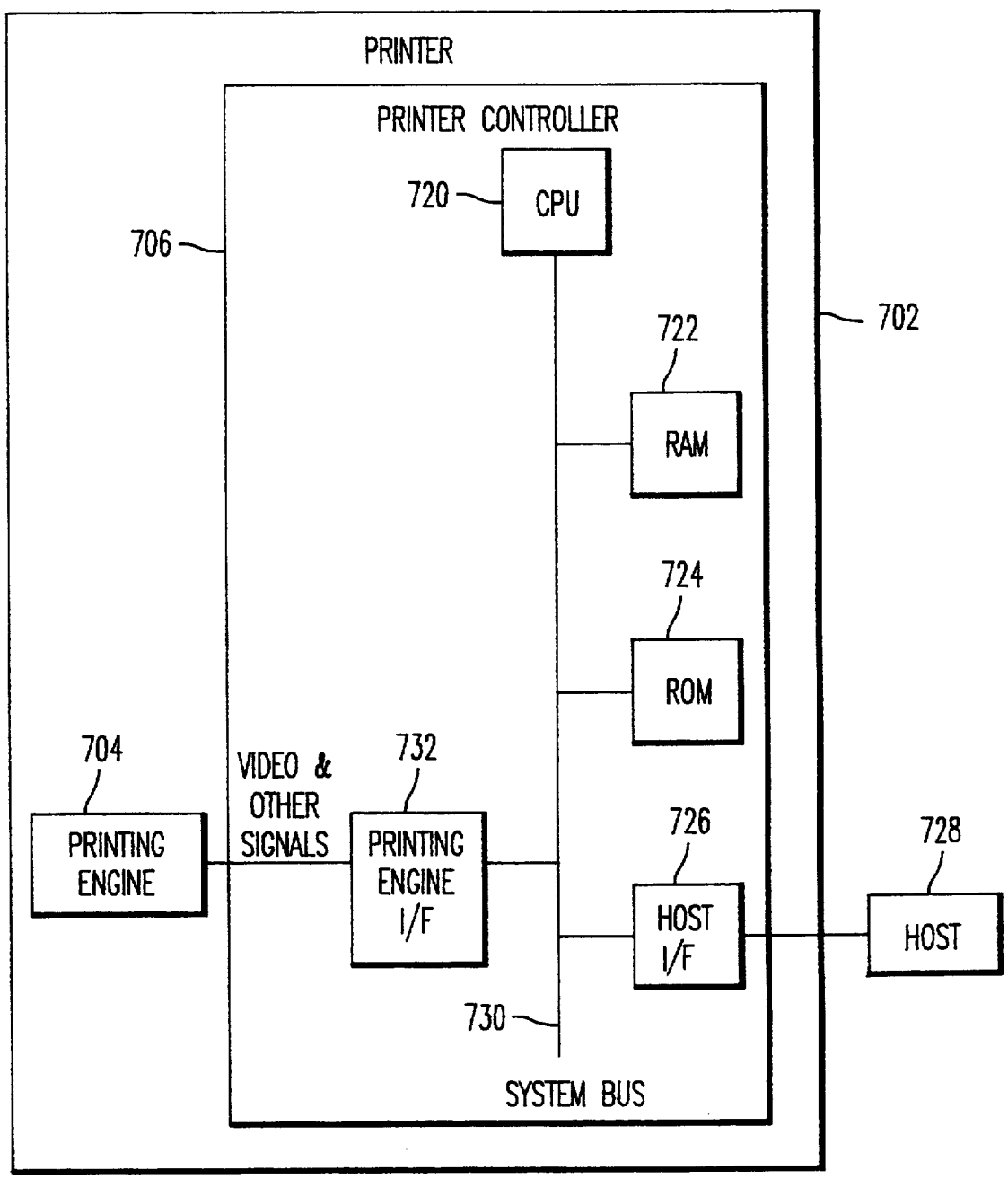
FIG. 8 illustrates a printer controller for employing the present invention.

FIG. 8 illustrates the details of the printer controller 706 of printer 702. The printer controller is connected to a host 728 through a host interface 726. Host 728 can be any computer and could, for example be a workstation 708. The workstation 708 can be connected to host 728 through the network 714, a serial printer cable, or a parallel printer cable, for example. The printer controller also contains a CPU 720, RAM 722, ROM 724 embodying the process of the present invention, a printing engine interface 732, and a system bus 730 connecting the elements of the printer controller. The printing engine interface 732 outputs rasterized image data in the form of video and other signals to the printer engine 704.

Figure 9:
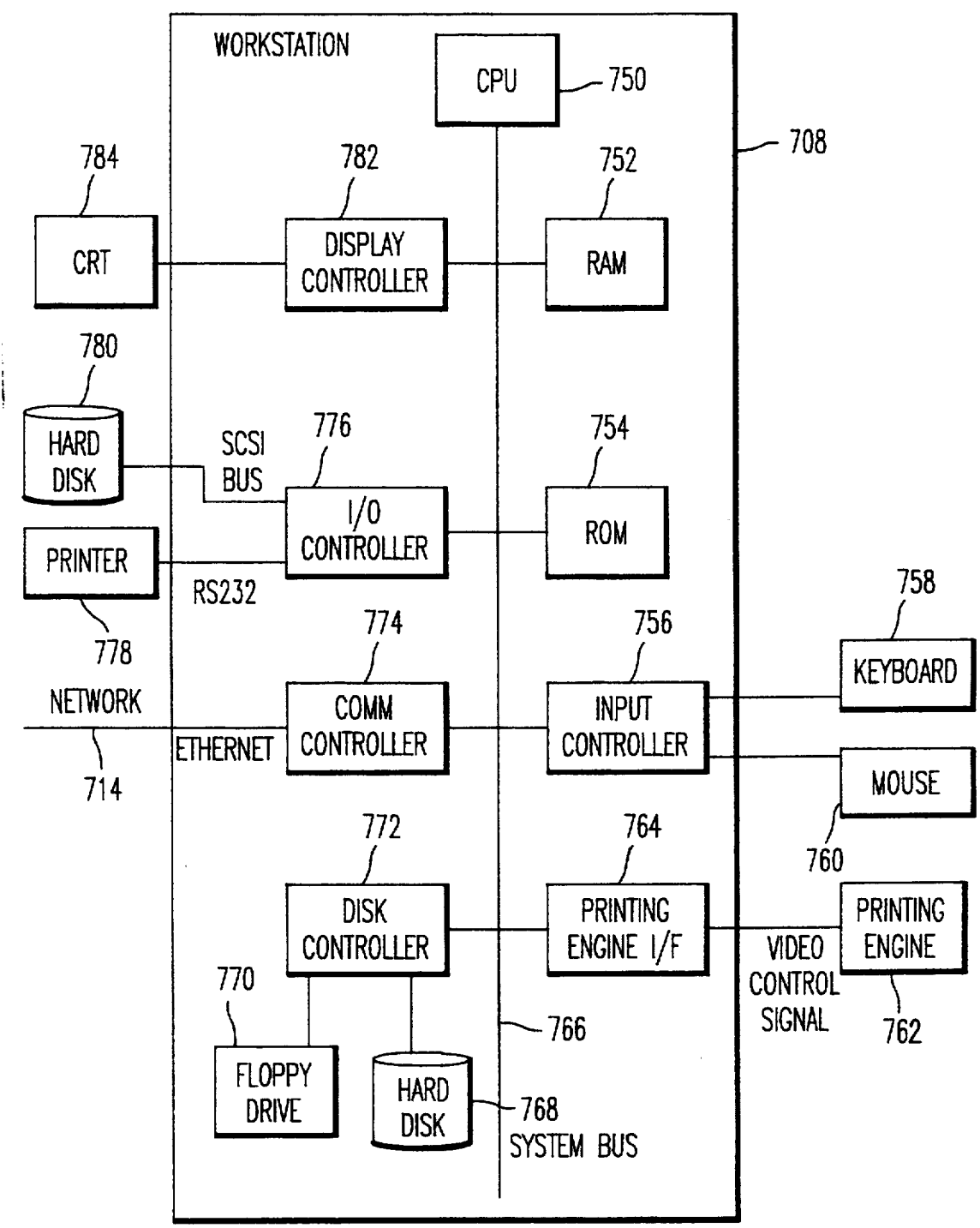
FIG. 9 illustrates a workstation for employing the present invention.

FIG. 9 illustrates the makeup of workstation 708. Workstation 708 contains CPU 750, RAM 752, ROM 754, input controller 756 connected to a keyboard 758 and mouse 760. A printing engine interface is connected directly to a printing engine 762 which receives video and control signals for rasterized image data transmitted by the printer engine interface 764. The workstation further contains a disk controller 772 connected to a hard disk 768 and floppy drive 770, a communication controller 774 for connection to the network 714 which can be for example, an Ethernet ® network, an I/O controller 776 connected to an external hard disk 780 through a SCSI bus, for example, and a printer 778, connected through an RS-232 cable, for example. The workstation also contains a display controller 782 connected to a CRT 784. A system bus 766 connects the elements within the workstation.

An SPDL file to be processed and printed can be directly created by workstation 708 or can be first created by workstation 708 and then stored in either of the hard disks 768 or 780, the floppy drive 770 or the RAM 752 for example. The SPDL file can then be processed for printing by the CPU 750 by processing the SPDL file into rasterized image data which is sent through bus 766 through printer engine interface 764 and finally to printing engine 762 in the form of video and control signals so the image data can be printed on printing engine 762.

Figure 10:
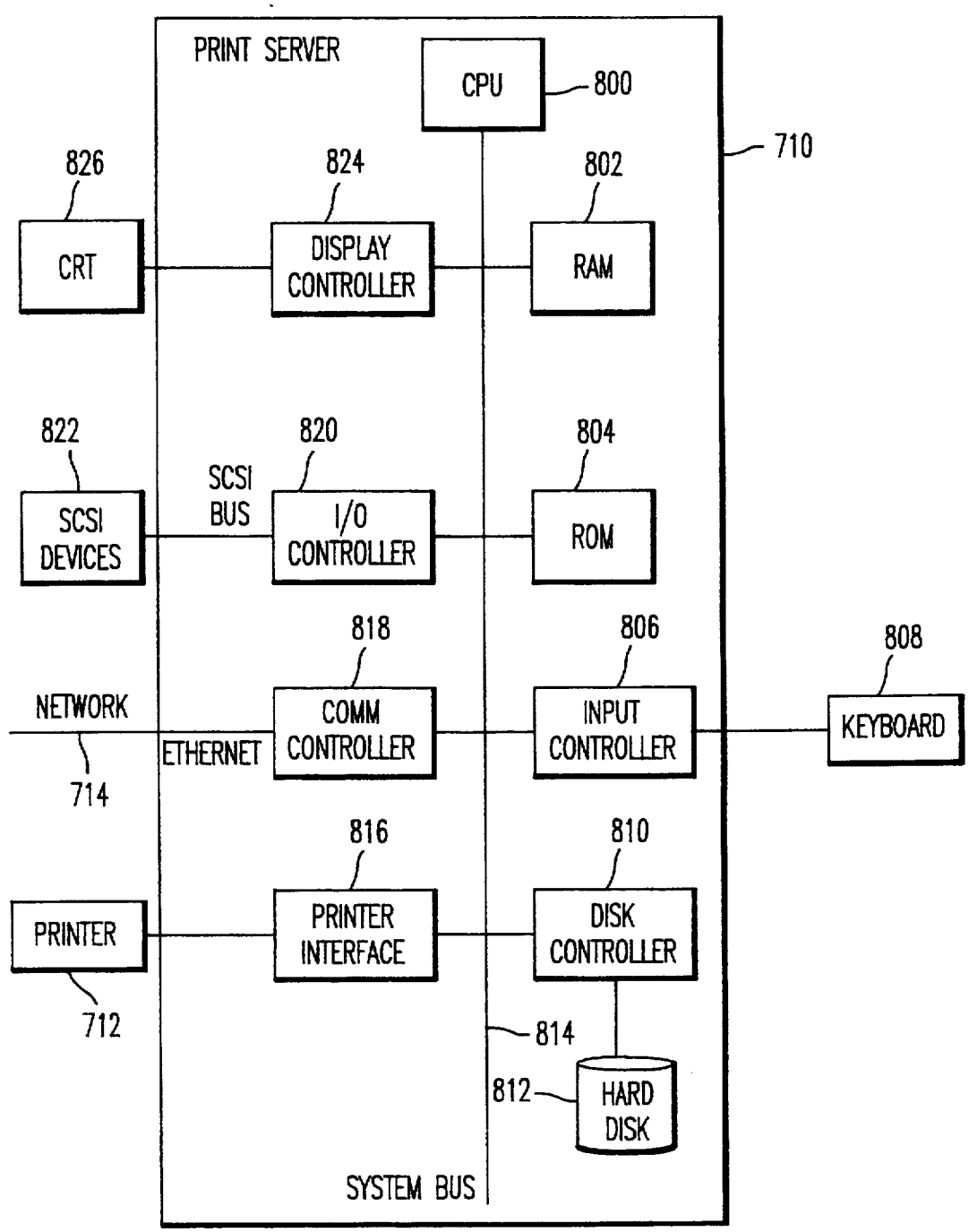
FIG. 10 illustrates a print server for employing the present invention.

The print server 710 illustrated in FIG. 10 has a basic makeup very similar to workstation 708. The print server 710 receives an SPDL file sent over the network 714 and received by communication controller 818. The CPU 800 determines whether the received file is in a binary or clear text SPDL format or some other encoding format according to the process of the present invention. Next, the file is processed by the CPU and sent over system bus 814 to printer interface 816 to printer 712. The CPU 800 can process the document into different formats. For example, the SPDL document can be processed into a postscript ® representation and transmitted to a printer 712 which would be PostScript ® compatible. Alternatively, the CPU 800 can process the SPDL file into one of the escape sequence type of languages, such as those that are native to the Hewlett Packard (HP) Laserjet ® series of printers (e.g. PCL) and therefore, it can be assumed in this circumstance printer 712 would be HP Laserjet ® compatible. It is also possible for the CPU to process the SPDL document into a format used by raster capable printers such as dot matrix, inkjet, or thermal printers, or any other type of raster capable printer. It is also possible that the CPU 800 processes the SPDL file into a raster image, with the raster data then being sent to a printer engine within printer 712.

Obviously, numerous modifications and variations of the present invention are possible in light of the above teachings. For example, the present invention is not limited to any specific syntax of a page description language but can be used with a page description language which accomplishes the same function as described in the specification. Further, the picture/pageset stack may be implemented in an equivalent manner using a series of linked lists. Also, the selection page range FIFO data structure can be implemented in an equivalent manner using the stack which first pushes thereon the highest page numbers and the lowest page numbers are pushed onto the stack last. Therefore, when pages are popped off of the stack, this popping is equivalent to popping the pages out of the FIFO data structure as described in the specification. Further, the FIFO data structure can be implemented in an equivalent manner using a series of linked lists. It is therefore to be understood that in the scope of the appended claims, the invention may be practiced otherwise than as specifically described herein.

What is claimed as new and desired to be secured by Letters Patent of the United States is:

1. A method for processing a hierarchically structured document having hierarchical levels containing pagesets and pages, a first hierarchical level of the document being a highest hierarchical level of the document, the pagesets comprising at least one of a page and a pageset, each page being subordinate to a corresponding pageset, at least one of the pagesets having pages thereof selected, comprising the steps of:
  pushing an entry onto a means for keeping track of the hierarchical levels, each time a pageset is encountered;
  creating a page selection data structure, referenced by said means for keeping track of hierarchical levels, having entries for the selected pages of one of said pagesets, upon processing each of said at least one of the pagesets which has selected pages, each created page selection data structure corresponding to one of said pagesets and the pages thereof;
  performing a page selection operation by performing the steps of:
  incrementing a page number counter which corresponds to a lowest hierarchical level of the document;
  determining if a value of said page number counter corresponds to an entry in a lowest hierarchical level page selection data structure and is therefore selected for the lowest hierarchical level;
  when the value of said counter corresponds to an entry in the lowest hierarchical level page selection data structure, performing, for each hierarchical level containing a pageset above the lowest hierarchical level containing a pageset, the steps of:
    incrementing a value of a higher page number counter designating all pages at a higher hierarchical level and only selected pages at lower hierarchical levels, said higher hierarchical level of the document being higher in said hierarchy than a last processed hierarchical level;
    determining if the value of the higher page number counter corresponds to an entry designating said page in a higher one of said page selection data structures which corresponds to the pageset being processed and is therefore selected for a higher hierarchical level, and
    if the value of the higher page number counter corresponds to an entry in a higher one of said page selection data structures, repeating, for a next higher hierarchical level containing a pageset if the next higher hierarchical level containing the pageset exists, the step of incrementing a higher page number counter and the step of determining if the value of the higher page number counter corresponds to an entry in a higher one of said page selection data structures, said repeating occurring for each higher hierarchical level until a highest level pageset is encountered or a value of the higher page number counter does not correspond to an entry in the higher page selection data structure,
  said method further including the step of selecting a page at the lowest hierarchical level for the entire document when the page is selected at the lowest hierarchical level and each of the hierarchical levels above the lowest hierarchical level.

2. A method according to claim 1, wherein the step of creating a page selection data structure creates a page selection data structure which is a FIFO data structure.

3. An apparatus for processing a hierarchically structured document having hierarchical levels containing pagesets and pages, a first hierarchical level of the document being a highest hierarchical level of the document, the pagesets comprising at least one of a page and a pageset, each page being subordinate to a corresponding pageset, at least one of the pagesets having pages thereof selected, comprising:

means for pushing an entry onto a means for keeping track of the hierarchical levels, each time a pageset is encountered;

means for creating a page selection data structure, referenced by said means for keeping track of hierarchical levels, having entries for the selected pages of one of said pagesets, upon processing each of said at least one of the pagesets which has selected pages, each created page selection data structure corresponding to one of said pagesets and the pages thereof;

a first selection means for selecting said pages by performing the steps of:

incrementing a page number counter which corresponds to a lowest hierarchical level of the document;

determining if a value of said page number counter corresponds to an entry in a lowest hierarchical level page selection data structure and is therefore selected for the lowest hierarchical level;

a second selection means for selecting each hierarchical level of the document containing a pageset above the lowest hierarchical level containing a pageset when the value of said page number counter, which corresponds to the lowest hierarchical level of the document, corresponds to an entry in the lowest hierarchical level page selection data structure, by performing the steps of:

incrementing a value of a higher page number counter designating all pages at said higher hierarchical level and only selected pages at lower hierarchical levels, said higher hierarchical level of the document being higher in said hierarchy than a last processed hierarchical level;

determining if the value of the higher page number counter corresponds to an entry designating said page in a higher one of said page selection data structures which corresponds to the pageset being processed for selection and is therefore selected for a higher hierarchical level, and if the value of the higher page number counter corresponds to an entry in a higher one of said page selection data structures, repeating, for a next higher hierarchical level containing a pageset if the next higher hierarchical level containing .the pageset exists, the step of incrementing a higher page number counter and the step of determining if the value of the higher page number counter corresponds to an entry in a higher one of said page selection data structures, said repeating occurring for each higher hierarchical level until a highest level pageset is encountered or a value of the higher page number counter does not correspond to an entry in the higher page selection data structure, said method further including the step of selecting a page at the lowest hierarchical level for the entire document when the page is selected at the lowest hierarchical level and each of the hierarchical levels above the lowest hierarchical level.

4. An apparatus according to claim 3, wherein means for creating a page selection data structure creates a page selection data structure which is a FIFO data structure.

5. A computer implemented method for determining if a page of a hierarchically structured document which is contained within two pagesets is selected for processing, a first of the pagesets occurring first in the document and being a superior structure element to a second of the pagesets, the method comprising the steps of:

creating a first data structure having fields which correspond to the hierarchical levels of the document;

creating a first field for the first pageset of the document in said first data structure;

creating a reference for said first field to a first page selection data structure which has a page index field for the first pageset and a field for storing information indicating which pages of the first pageset are selected;

creating a second field for the second pageset of the document in said first data structure;

creating a reference for said second field to a second page selection data structure which has a page index field for the second pageset and a field for storing information indicating which pages of the second pageset are selected;

incrementing the page index of the second page selection data structure whenever a page of the second pageset is processed for selection;

determining if a page is selected by the second pageset by examining if said page is contained within the field of the second page selection data structure for storing information indicating which pages of the second pageset are selected;

incrementing the page index of the first page selection data structure whenever a page of the second pageset is determined to be selected by the second pageset, the page index of the first page selection data structure designating all pages of the first pageset and only selected pages of the second pageset;

determining if said page is selected by the first pageset by examining if the page index field for the first pageset is contained within the field of the first page selection data structure for storing information indicating which pages of the first pageset are selected; and selecting the page when the page is determined to be selected by both the first and second pageset.

6. A method according to claim 5, wherein when all pages of a pageset are selected, the reference corresponding to the pageset for said data structure for keeping track of hierarchical levels is set to null.

7. A method according to claim 6, wherein the data structure for keeping track of the hierarchical levels of the document is a stack, and the first field is pushed into the stack before the second field is pushed into the stack, and said step of determining if a page is selected by the second pageset examines if the reference for the second field is null and examines the first reference for the first pageset when the second reference is determined to be null.

8. A method according to claim 5, wherein the page selection data structures are created to have a flag indicating that there are no more pages to be selected in a corresponding pageset.

9. A method according to claim 5, wherein the field for storing information indicating which pages are selected is a First In First Out (FIFO) data structure having two entries for each range of pictures which are selected, lower page numbers being placed first into the FIFO data structure and higher page numbers being placed into the FIFO data structure after the lower page numbers.

10. A method according to claim 9, further comprising the step of:
deleting an entry in the FIFO data structure after a page corresponding to a second entry of a range is processed.

11. A method according to claim 10, wherein after all entries of the FIFO data structure are deleted a flag of the page select data structure is set to "No Selection".

12. A method according to claim 9, wherein a first of the two entries for each range is examined to determine if a page falls within a specified range.

13. A system for determining if a page of a hierarchically structured document which is contained within two pagesets is selected for processing, a first of the pagesets occurring first in the document and being a superior structure element to a second of the pagesets, comprising:
means for creating a first data structure having fields which correspond to the hierarchical levels of the document;
means for creating a first field for the first pageset of the document in said first data structure;
means for creating a reference for said first field to a first page selection data structure which has a page index field for the first pageset and a field for storing information indicating which pages of the first pageset are selected;
means for creating a second field for the second pageset of the document in said first data structure;
means for creating a reference for said second field to a second page selection data structure which has a page index field for the second pageset and a field for storing information indicating which pages of the second pageset are selected;
means for incrementing the page index of the second page selection data structure whenever a page of the second pageset is processed for selection;
means for determining if a page is selected by the second pageset by examining if said page is contained within the field of the second page selection data structure for storing information indicating which pages of the second pageset are selected;
means for incrementing the page index of the first page selection data structure whenever a page of the second pageset is determined to be selected by the second pageset, the page index of the first page selection data structure designating all pages of the first pageset and only selected pages of the second pageset;
means for determining if said page is selected by the first pageset by examining if the page index field for the first pageset is contained within the field of the first page selection data structure for storing information indicating which pages of the first pageset are selected; and
means for selecting the page when the page is determined to be selected by both the first and second pageset.

14. A system according to claim 13, wherein when all pages of a pageset are selected, the reference corresponding to the pageset for said data structure for keeping track of hierarchical levels is set to null.

15. A system according to claim 14, wherein the data structure for keeping track of the hierarchical levels of the document is a stack, and the first field is pushed into the stack before the second field is pushed into the stack, and
said means for determining if a page is selected by the second pageset examines if the reference for the second field is null and examines the first reference for the first pageset when the second reference is determined to be null.

16. A system according to claim 13, wherein the page selection data structures are created to have a flag indicating that there are no more pages to be selected in a corresponding pageset.

17. A system according to claim 13, wherein the field for storing information indicating which pages are selected is a First In First Out (FIFO) data structure having two entries for each range of pictures which are selected, lower page numbers being placed first into the FIFO data structure and higher page numbers being placed into the FIFO data structure after the lower page numbers.

18. A system according to claim 17, further comprising:
means for deleting an entry in the FIFO data structure after a page corresponding to a second entry of a range is processed.

19. A system according to claim 18, wherein after all entries of the FIFO data structure are deleted a flag of the page select data structure is set to "No Selection".

20. A system according to claim 17, wherein a first of the two entries for each range is examined to determine if a page falls within a specified range.

* * * * *